United States Patent
Inanc et al.

(10) Patent No.: US 8,440,961 B2
(45) Date of Patent: May 14, 2013

(54) GAMMA RAY GENERATOR

(75) Inventors: Feyzi Inanc, Spring, TX (US); W. Allen Gilchrist, Jr., Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 409 days.

(21) Appl. No.: 12/755,701

(22) Filed: Apr. 7, 2010

(65) Prior Publication Data

US 2010/0252726 A1    Oct. 7, 2010

Related U.S. Application Data

(60) Provisional application No. 61/167,328, filed on Apr. 7, 2009.

(51) Int. Cl.
*G01V 5/10* (2006.01)

(52) U.S. Cl.
USPC ..................................... 250/269.7

(58) Field of Classification Search ............ 250/269.7
See application file for complete search history.

(56) References Cited

U.S. PATENT DOCUMENTS

| | | | |
|---|---|---|---|
| 3,842,265 A * | 10/1974 | Pitts, Jr. ................ 250/269.8 |
| 4,008,392 A * | 2/1977 | Lock et al. ................ 376/161 |
| 4,297,575 A | 10/1981 | Smith, Jr. et al. |
| 5,397,893 A | 3/1995 | Minette |
| 5,591,967 A * | 1/1997 | Moake .................. 250/252.1 |
| 5,608,215 A | 3/1997 | Evans |
| 5,767,510 A * | 6/1998 | Evans .................. 250/269.1 |
| 5,804,820 A | 9/1998 | Evans et al. |
| 5,900,627 A | 5/1999 | Odom et al. |
| 7,334,465 B2 | 2/2008 | Smits et al. |
| 2005/0067160 A1 | 3/2005 | Jacobson |
| 2006/0093087 A1* | 5/2006 | Procter ...................... 378/57 |
| 2006/0192096 A1 | 8/2006 | Radtke et al. |
| 2009/0026359 A1 | 1/2009 | Stephenson et al. |

FOREIGN PATENT DOCUMENTS

WO     2009023437 A2    2/2009

OTHER PUBLICATIONS

Notification of Transmittal of the International Search report and the Written Opinion of the Internatinoal searching Authority, or the Declaration, PCT/US2010/030216; Mailed Nov. 30, 2010.

(Continued)

*Primary Examiner* — David Porta
*Assistant Examiner* — Hugh H Maupin
(74) *Attorney, Agent, or Firm* — Cantor Colburn LLP

(57) ABSTRACT

An instrument for performing measurements downhole, includes an irradiator oriented to irradiate sub-surface materials surrounding the instrument, the irradiator including at least one neutron source disposed proximate to a moderator for providing a source of inelastic gamma photons and also disposed proximate to a material for providing a source of capture gamma photons; and a first detector and a second detector, each detector for detecting gamma rays and oriented in a relationship to the irradiator for receiving gamma photons from at least one of the irradiator and the formation. A method for irradiating sub-surface materials is provided.

18 Claims, 19 Drawing Sheets

OTHER PUBLICATIONS

Notification of Transmittal of the International Search report and the Written Opinion of the Internatinoal searching Authority, or the Declaration, PCT/US2010/030217; Mailed Oct. 20, 2010.

Neuman, C.H., M.J. Sullivan and D.L. Belanger, "An Investigation of Density Derived from Pulsed Neutron Capture Measurements" (Abstract Only), SPE 56647 Annual Technical Conference and Exhibition, Oct. 3-6, 1999.

B.W. and Archer, M.P. "Applications and Derivation of a New Cased-Hole Density Porosity in Shaly Sands" (Abstract Only), SPE 38699 Annual Technical Conference and Exhibition, Oct. 5-8, 1997.

Rennie, Allan. "LWD System Provides Real-Time, Memory-Recorded Bulk Density, Density Porosity, Ultrasonic Caliper Measurements" (Abstract Only), Drilling Contractor Magazine Sep./Oct. 2006 Ed., pp. 14-16.

* cited by examiner

Spatial Distribution of Compton Scattering Interaction Rates

Spatial Distribution of Photoelectric Absorption Interaction Rates

GAMMA RAY GENERATOR

BACKGROUND OF THE INVENTION

1. Field of the Invention

The invention disclosed herein relates to exploration for oil and gas and, in particular, to a pulsed neutron generator.

2. Description of the Related Art

In the exploration for oil and gas, it is necessary to drill a borehole into the earth. While drilling of the borehole permits individuals and companies to evaluate sub-surface materials and to extract desired hydrocarbons, many problems are encountered.

For example, use of nuclear instrumentation presents significant safety issues for personnel. That is, aside from the burden of complying with regulation governing the handling of sources of ionizing radiation, workers tasked with performing well logging issues are often asked to handle radioactive sources that can cause detrimental health effects if great care is not taken.

One example is that of a logging instrument that uses a cesium-137 (Cs-137) source. Typically, the Cs-137 source is of a considerable strength. Accordingly, the cost of maintaining the source, the safety issues, and the additional tooling required to support use of the Cs-137 source can make such implementations expensive.

Therefore, what are needed are methods and apparatus that provide for reduced health and safety issues and cost when performing well logging with nuclear instrumentation. Preferably, the methods and apparatus provide for reductions in source terms associated with such instrumentation.

BRIEF SUMMARY OF THE INVENTION

In one embodiment, the invention includes an instrument for performing measurements downhole, the instrument including: an irradiator oriented to irradiate sub-surface materials surrounding the instrument, the irradiator including at least one neutron source disposed proximate to a moderator for providing a source of inelastic gamma photons and also disposed proximate to a material for providing a source of capture gamma photons; and a first detector and a second detector, each detector for detecting gamma rays and oriented in a relationship to the irradiator for receiving gamma photons from at least one of the irradiator and the formation.

In another embodiment, the invention includes a method for irradiating sub-surface materials, the method including: using an instrument downhole, the instrument including an irradiator oriented to irradiate sub-surface materials surrounding the instrument, the irradiator including a pulsed neutron source disposed proximate to a moderator for providing a source of inelastic gamma photons and also disposed proximate to a material for providing a source of capture gamma photons; energizing the pulsed neutron source to provide a neutron flux; and directing at least one of the neutron flux, the inelastic gamma photons and the capture gamma photons into the sub-surface materials.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Disclosed are methods and apparatus for making use of an unused neutron population for generation of gamma photons, and using those photons for density measurements. Advantageously, the techniques provide for elimination of a separate source of gamma photons traditionally included in a logging instrument, thereby reducing cost and enhancing radiological safety.

Other improvements resulting from elimination of the gamma source (also referred to in the art as a "chemical source") include reductions in shielding and results in a more compact tool. The more compact and simplified tool also results in simplification of maintenance requirements. In short, the teachings herein provide significant added value to a pulse neutron generator based tool deployed for other purposes.

Figure 1:
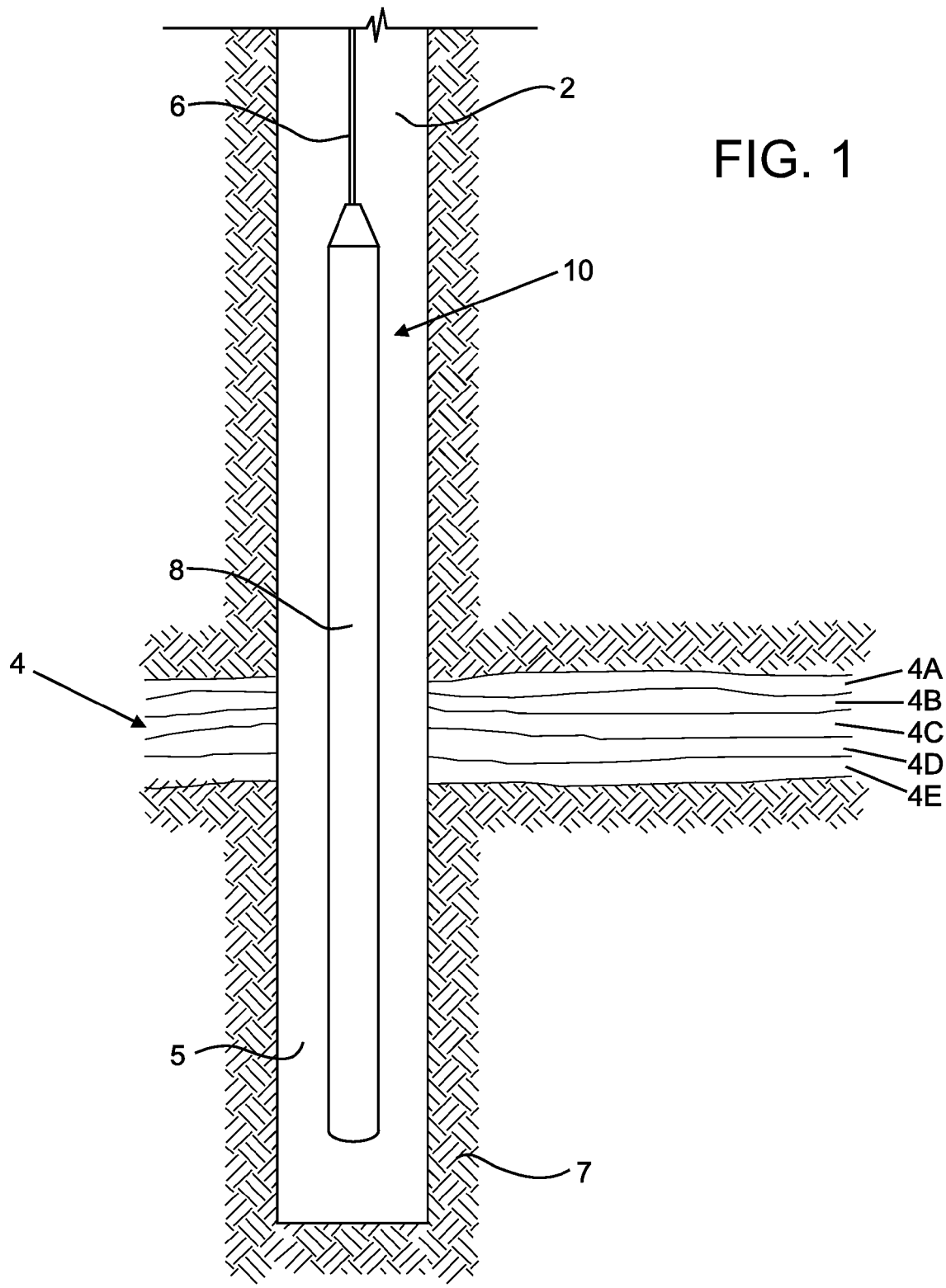
FIG. 1 illustrates an exemplary embodiment of a logging instrument in a borehole penetrating the earth.

Referring now to FIG. 1, an exemplary well logging instrument 10 is shown disposed in a borehole 2. The borehole 2 is drilled through earth 7 and penetrates formations 4, which include various formation layers 4A-4E. The logging instrument 10 may be lowered into and withdrawn from the borehole 2 by use of an armored electrical cable 6 or similar conveyance as is known in the art.

In typical embodiments, the borehole 2 includes materials such as would be found in oil exploration, including a mixture of liquids such as water, drilling fluid, mud, oil, gases, and formation fluids as may be indigenous to the surroundings. One skilled in the art will recognize that the various geologic features as may be encountered in a subsurface environment may be referred to as "formations," and that the array of materials down the borehole (i.e., downhole) may be referred to as "sub-surface materials." That is, the formations are formed of sub-surface materials. Accordingly, as used herein, it should be considered that while the term "formation" generally refers to geologic formations of interest, and "sub-surface material," includes any materials of interest such as fluids, gases, liquids, and the like, and may include other materials such as drilling mud. A layer of materials between an outer surface of the instrument 10 and a wall of the borehole 2 is referred to as a "standoff layer" 5, and includes a thickness of standoff.

The teachings herein provide for making accurate measurements of properties of the sub-surface materials. Before the logging instrument and techniques are discussed in detail, certain additional definitions are provided.

As used herein, the term "gamma radiation detector" relates to instruments that measure the gamma radiation entering the instrument. For example, the gamma radiation detector may use a scintillator material that interacts with gamma radiation and produces light photons which are in turn detected by a photomultiplier tube coupled to electronics. Exemplary gamma radiation detectors include, without limitation, sodium iodide (NaI), cesium iodide (CsI), bismuth germinate (BGO), thallium iodide (TlI), and other organic crystals, inorganic crystals, plastics, solid state detectors, and combinations thereof.

Also as used herein, the term "characterization data" generally makes reference to a radiological profile (e.g., a gamma emission profile) of the instrument. More specifically, the instrument will exhibit certain radiological characteristics. In various embodiments, these characteristics are a result of irradiation with neutrons, and activation of components of the instrument which may ultimately result in emission of gamma rays from the components. Non-limiting embodiments for the generation of characterization data are provided herein.

The term "detector geometry" relates to a configuration of the gamma radiation detector(s). The detector geometry may include a size and a shape of the scintillator material and photomultiplier or other type of detector. The term "placement geometry" relates to relative placement of a gamma radiation detector within the logging instrument or in relation to the surrounding volume. The term "logging while drilling" (LWD) relates to measuring parameters from the borehole 2 while drilling is taking place. The term "sonde" relates to a section of the well logging tool that contains measurement sensors as opposed to the section that contains electronics and power supplies.

The terms "neutron capture" or "capture" make reference to a kind of nuclear interaction in which a neutron collides with an atomic nucleus and is merged into the nucleus, thus forming a heavier nucleus. As a result, the heavier nucleus enters into a higher energy state. At least some of the energy of the neutron capture interaction is usually lost by emission of gamma rays.

The terms "inelastic collision," "neutron inelastic scattering" or "inelastic" make reference to a collision in which an incoming neutron interacts with a target nucleus and causes the nucleus to become excited, thereby releasing a gamma ray before returning to the ground state. In inelastic collisions, the incoming neutron is not merged into the target nucleus, but transfers some of its energy to the target nucleus before that energy is released in the form of a gamma ray.

Various types of interactions involve either absorption or emission of gamma radiation. Predominant types (as a function of increasing energy) include photoelectric effect, Compton scattering and pair production. As a matter of convention, "photoelectric effect" relates to interactions where electrons are emitted from matter after the absorption of a gamma ray. The emitted electrons may be referred to as "photoelectrons." The photoelectric effect may occur with photons having energy of about a few eV or higher. If a photon has sufficiently high energy, Compton scattering or pair production may occur. Generally, Compton scattering relates to a decrease in energy (increase in wavelength) of a gamma ray photon when the photon interacts with matter. In pair production, higher energy photons may interact with a target and cause an electron and a positron pair to be formed.

Further, it should be noted that a variety of neutron emitting sources are known. Examples include americium-beryllium (AmBe) sources, plutonium-beryllium (PuBe) sources, californium sources (e.g., Cf-242) and others. Therefore, while the teachings herein are generally directed to a pulsed neutron source, it should be recognized that the term "neutron emitting," "neutron generator," and the like may be considered with reference to the variety of sources now available or subsequently devised for providing neutrons downhole.

Density tools use gamma ray radiation to determine the density of the formation, which in turn leads to determination of the lithology and porosity of the well environment. Typical density tools utilize a Cs-137 radioactive source to generate gamma rays. One example is provided in FIG. 2, and discussed below.

Figure 2:
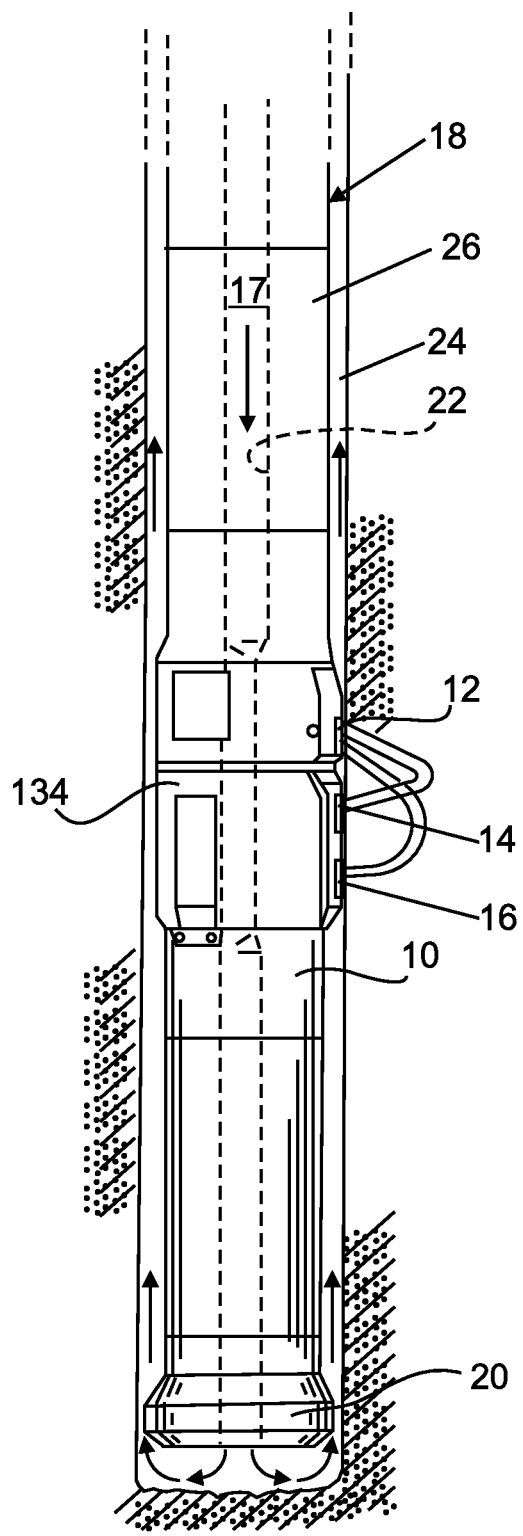
FIGS. 2 and 3 depict aspects of exemplary embodiments of prior art logging instruments.

Referring now to FIG. 2, a diagram of basic components of a prior art gamma-ray density tool 10 is shown. This tool 10 includes a drill collar which contains a gamma-ray source 12 and two spaced gamma-ray detector assemblies 14 and 16. All three components are placed along a single axis that has been located parallel to the axis of the tool 10. The detector 14 closest to the gamma-ray source may be referred to as a "short space detector" and the detector farthest away (16) is referred to as a "long space detector." As will be discussed hereinafter, gamma-ray shielding is located between detector assemblies 14, 16 and source 12. Windows open up to the formation from both the detector assemblies and the source. A layer of drilling fluid (mud) is present between the formation and the detector assemblies and source as the standoff layer 5.

The tool 10 is placed into service by loading it with the sealed chemical source 12 (typically cesium 137) and lowering it into the formation 4. Gamma-rays are continuously emitted by the source 12 and these propagate out into the formation 4.

Two physical processes dominate the scattering and absorption of gamma rays at the energies used in density tools. They are Compton scattering and photoelectric absorption. A cross section for Compton scattering, $\sigma_{cs}$, (i.e., probability of scattering while passing through a set thickness of material) is proportional to the electron density in the formation and is weakly dependent on the energy of the incident gamma ray (on a graph, this falls fairly slowly with increasing energy). Since the electron density is, for most formations, approximately proportional to the bulk density, the Compton cross section, $\sigma_{cs}$, is proportional to the density of the formation. The photoelectric absorption cross section, $\sigma_{pe}$, is also proportional to the electron density. Unlike the Compton cross section, $\sigma_{cs}$, photoelectric absorption cross section, $\sigma_{pe}$, is strongly dependent on the energy of the incident gamma rays and on the materials in the formation (the lithology).

Formation density is determined by measuring the attenuation of gamma rays through the formation. In this prior art tool, shielding is included in the tool to reduce a flux of gamma rays traveling straight through the tool. This flux can be viewed as background noise for the formation signal. The windows (in the detector hatch cover and fluid displacement sleeve 134) let gamma rays go into the formation and from the formation to the detectors. The layer of mud between the tool and the formation may be reduced by the use of an "in gauge" sleeve 134. After the standoff 5 (i.e., the mud layer) is minimized, density measurements made by using the two detectors 14, 16 are combined to form a compensated measurement.

As mentioned, compensation for the mud and/or standoff is usually accomplished through the use of the short space detector 14 and the long space detector 16. Since gamma rays travel through more of the formation 4 to reach the long space detector 16 than they do to reach the short space detector 14, the long space detector 16 shows a significantly larger count rate change for a given change in formation density. This allows for the compensation by using the two detector responses and a "rib" algorithm. The rib function, provides for the calculation of compensation (which should be equal to the difference between the true and the measured long space density), as a function of the difference between the short and long space densities. These aspects and other aspects are known in the prior art, and generally not discussed in greater depth herein. However, one reference that includes these aspects is U.S. Pat. No. 5,397,893, entitled "Method for analyzing formation data from a formation evaluation measurement-while-drilling logging tool." This patent issued on May 14, 1995 and is assigned to Baker Hughes Incorporated. Accordingly, such relevant aspects disclosed therein are incorporated herein by reference. Having thus provided some context, an introduction to the invention is provided.

Disclosed herein are methods and apparatus for performing gamma-gamma density measurements using a neutron based instrument. The neutron based instrument does not include a chemical source, and therefore provides users with equipment that offers improved radiological safety as well as reduced cost. The teachings provided herein are particularly beneficial for making use of pulsed neutron generator based instruments deployed for other purposes, such as lithology and porosity measurements.

Embodiments of downhole tools using a pulsed neutron generator usually provide a burst of about 10E4-10E5 fast neutrons. When the neutron flux is averaged over time, this is equivalent to a steady state emission of about 10E8 neutrons/second. For these embodiments, an energy spectrum of the neutrons shows that the neutrons are very close to monoenergetic, and exhibit an initial energy of about 14.2 MeV, while an angular distribution of the neutrons is very close to isotropic. Therefore, neutrons provided by a pulsed neutron generator generally radiate in all directions, and penetrate not only into the formation direction but also into the tool itself. Accordingly, most tools making use of neutron sources include significant shielding for protection of other components.

The present invention takes advantage of the excess neutron population that is hazardous to other components on board the tool. As an overview, a sourceless gamma density tool includes a moderator close to the neutron generator. This is provided for thermalizing the high energy neutrons traveling into the tool and acting as a source for photons born out of inelastic scattering interactions of neutrons. Included is a surrogate material provided for capturing the thermalized neutrons. As a consequence of the surrogate material capturing thermalized neutrons, prompt gamma emissions result.

Example of a hydrogen rich moderator include various forms of high temperature plastics. Such plastics offer further advantages as these may be molded, machined or otherwise fabricated for incorporation into the downhole tool with relative ease. Another example can be a graphite moderator that can both slow down the neutrons and emit photons from neutron inelastic scattering event. Examples of surrogate material include cadmium, and other materials with high capture cross sections for thermal neutrons.

Cadmium has been selected as one material suited for use as the surrogate material as cadmium has a relatively high thermal neutron capture cross section, $\sigma_{0.025}$, of 2,520 barns (natural cadmium), 20,615 barns (Cd-113, percent abundance of about 12). Accordingly, use of the surrogate material is discussed in terms of cadmium and the properties thereof. However, it should be noted that a number of other materials may be suited for practice of the teachings herein. For example, isotopes of cadmium, hafnium, and/or gadolinium may be used. In general, desirable properties of the surrogate material include prompt gamma emission resulting from neutron capture, short half life as an activation product, at least one gamma emission of high abundance and at least one gamma emission of high energy.

Notably, the capture gamma ray spectrum of Cd-113 contains two significant lines. One is a 558.46 keV line with 100 percent relative yield and the other is a 651.26 keV one with 18.94 percent relative yield. Although there are many other lines, they are mostly less than one percent abundant. Therefore, it may be assumed that Cd-113 provides users with a source having essentially two lines. The energy levels of those lines put this into a range where the current gamma-gamma density tools operate with 662 keV Cs-137 photon lines.

Accordingly, use of a thermalizing material in conjunction with an appropriate surrogate material provides for emission of gamma rays from the tool in a manner quite similar to the existing tools using chemical sources.

In various embodiments of the sourceless gamma density tool, certain adaptations may be realized. For example, fluence of the neutrons generated, size and placement of the moderator, the surrogate material, collimation, detector size(s), and techniques for performing spectroscopy may all be adjusted as needed to enhance operation of the sourceless gamma density tool.

More specifically, and only by way of example, as brightness of the neutron driven gamma ray source will be lower than some embodiments of chemical sources, designers may compensate for reduced count rates by at least one of increasing a size of each detector and modifying collimation schemes. A variety of algorithms and fitting techniques (as are known in the art of gamma spectroscopy) may be used to provide for separation of photons associated with the surrogate material from photons originating in the formation from the inelastic and capture interactions. For example, when it comes to distinguishing photons, an energy based biasing can be implemented. That is, the capture and inelastic photons from the formation will exhibit higher energy levels compared to prompt gamma rays emitted from, for example, cadmium. In fact, photons from the surrogate material will have even lower energy levels after scattering inside the formation.

Of course, it should be recognized that geometry must be taken into consideration. For example, a relatively larger tool, such as one used in logging-while-drilling affords users with additional space for thermalizing the neutrons, and placing a surrogate material (like a Cd target) in suitable size to generate significant amount of gamma rays.

When the sourceless gamma density tool is in use, gamma rays emitted from the source pass into the formation. Depending on the density of the surrounding formation, some of the gamma rays will be absorbed in the surrounding sub-surface materials while others are reflected back to the tool. The ratio of returning gamma rays to absorbed gamma rays is useful in determining density of the surrounding formation 4.

Figure 3:
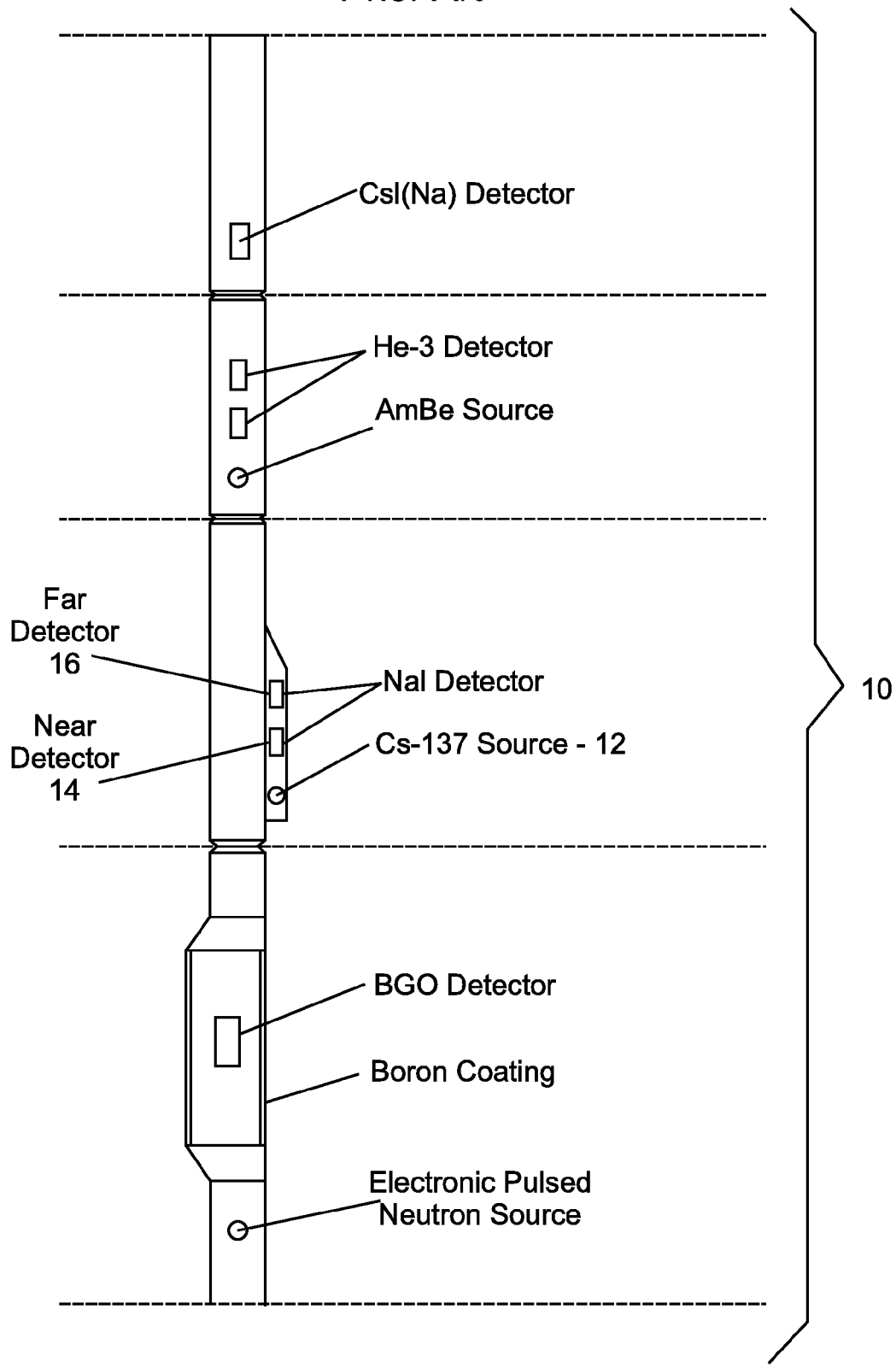

Referring now to FIG. 3, there is shown another embodiment of a prior art logging tool 10 (also referred to as an "instrument") that uses pulsed neutron emissions. In this example, the instrument makes use of a BGO scintillation detector, high speed downhole electronics, and an accelerator-based neutron source capable of pulsing at high frequencies. This instrumentation is packaged inside a high-strength titanium housing. Neutron and gamma ray shielding materials may be strategically placed inside the instrument to prevent the detection of gamma rays from unfavorable directions, and to protect operators from radiation exposure. In some embodiments, a recessed, abrasion-resistant boron-carbide ($B_4C$) shielding is placed on the housing over the detector section, to stop thermal neutrons.

While operating in the subsurface borehole environment, the electronically timed pulsed-neutron source emits neutrons having an energy of about 14 MeV. The neutrons are emitted into the ambient formation(s) 4 and the subsurface materials. In about 1-2 μsecs, these fast neutrons promptly interact with the nuclei of the surrounding sub-surface materials and scatter elastically as well as inelastically, ultimately losing their energy. Some of the nuclei of the atoms with which the neutrons interact become energetically excited during the inelastic scattering process, after which they return to the ground state by emitting one or more gamma rays with energies characteristic of the parent isotope. This process results in the measured inelastic spectrum of gamma ray energies, and can only take place if the energy of the incident neutron is sufficient to raise the nucleus of the parent isotope to one or more of its excited energy levels, or bound states.

The neutrons continue their slowing down process until they reach thermal equilibrium with the surrounding medium. Thermal neutrons typically possess energy of about 0.025 eV, and may remain in a diffusion process for up to about 800 μsec, or slightly more, before being absorbed by the nuclei of the surrounding atoms. This absorption results in new isotopes of the same elements. Upon absorption, the nuclei of these isotopes usually de-excite through emission of one or more gamma rays. As in the case of the inelastic spectrum, these energies carry the fingerprint of the parent isotope and allow each element (i.e., isotope) to be uniquely identified. This absorption process leads to the acquisition of the capture spectrum. The capture spectra and the inelastic spectra for each individual isotope are different.

In order to provide some detail, additional aspects are now discussed in greater detail.

Figure 4:
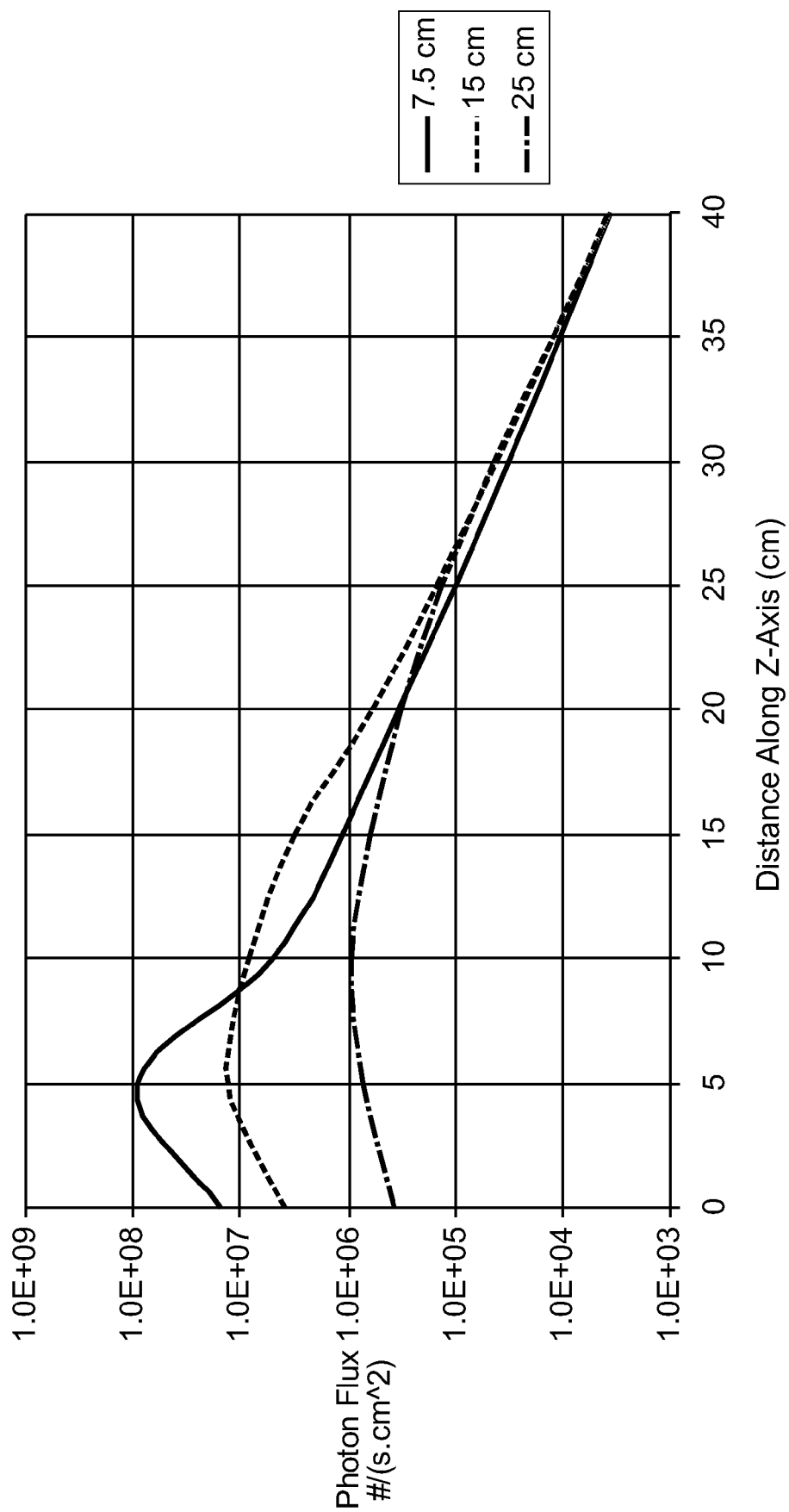
FIG. 4 is a graph depicting a variation of the photon flux along lines parallel to a density tool for a case without standoff.
Figure 5:
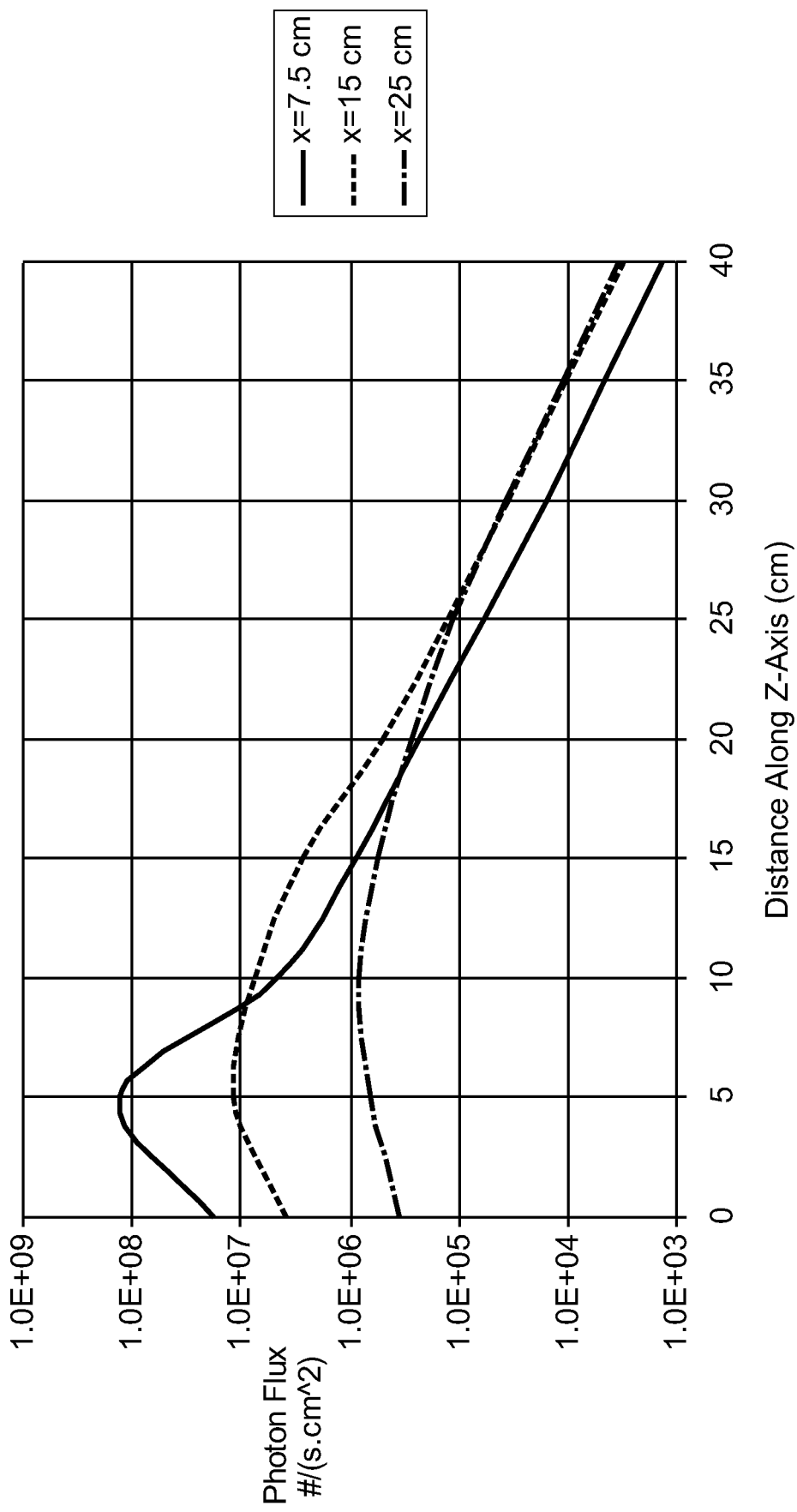
FIG. 5 is a graph depicting a variation of the photon flux along lines parallel to the density tool for a case with about 1 cm of standoff.

Due to their initial energy levels, photons from Cs-137 are not very penetrating, at least in comparison to most photons generated through neutron and matter interactions. Table I provides the mean free paths for 662 keV photons (Cs-137 characteristic photon energy) in various formation materials and some relevant fluids. As may be seen, there is a significant difference between the mean free paths for formation material and fluid. That basically indicates that if there is an uninterrupted fluid connection between source and detector, the density values would become inaccurate. This is one reason why density values reliant on data from the far detector should be corrected with the short space detector values. Reference may be had to FIGS. 4 and 5, where the flux profiles given correlate to a density instrument where a 7.5 cm profile is right outside the tool body, a 15 cm profile is 7.5 cm deep in the formation and a 25 cm profile is 17.5 cm deep into the formation. This shows that the flux profiles reach an asymptotic shape after about 20-25 cm from the source. When there is no standoff, the flux profile right outside the tool body is lower than the flux profiles deeper in the formation. This shows good quality from the measurement point of view.

Figure 6:
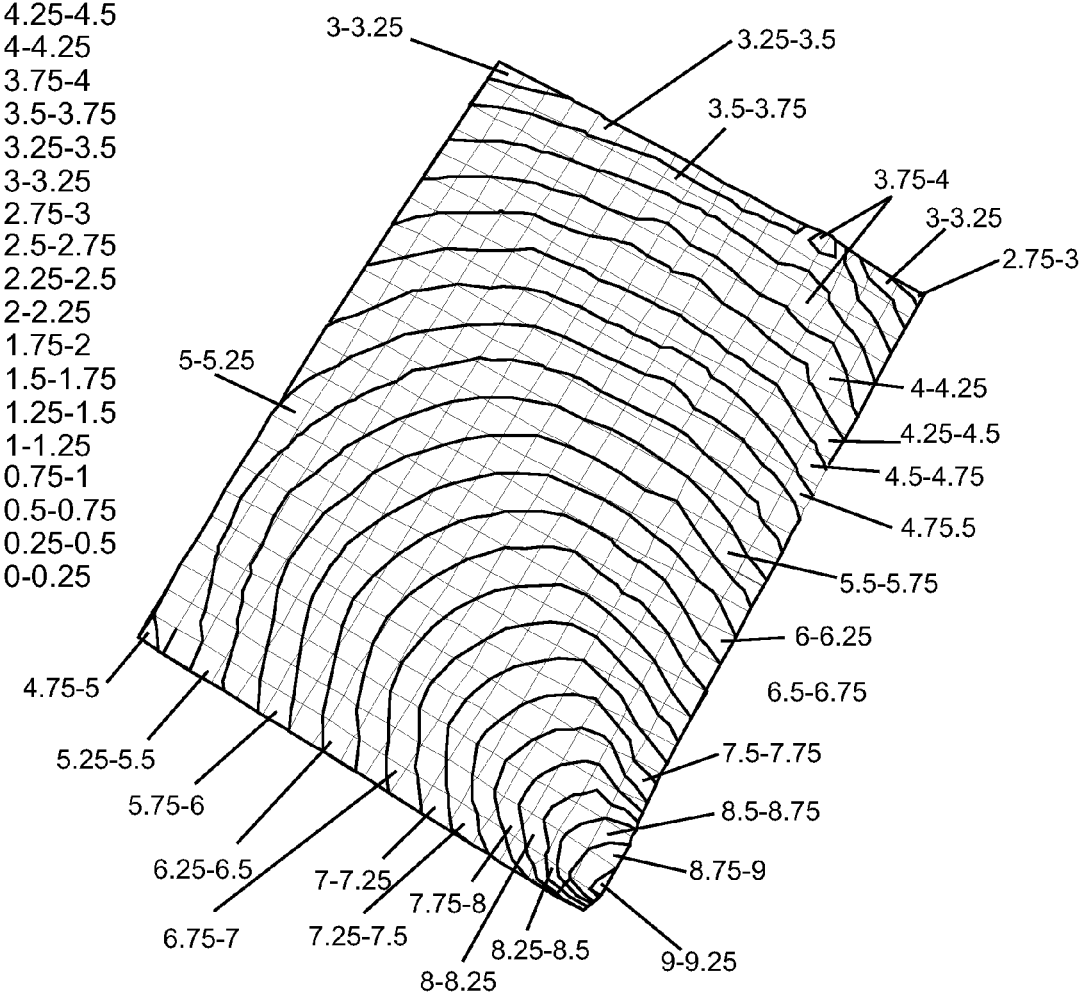
FIG. 6 is a graphic providing a spatial distribution of Compton scattering interactions inside a formation (logarithmic scale)

Consider now aspects of the short space detector 14, the long space detector 16, and gamma emissions from the tool 10 and from the formation 4. First, due at least in part to the larger size and distant placing of the long space detector 16, the long space detector 16 favors photons coming from deeper parts of formation 4. When there is a standoff 5, it may be seen that the flux profile outside the tool goes up to the levels of other profiles. Gamma rays travel comparatively easily through the water conduits along the tool body and this affects the measurements. The water between the tool 10 and the formation 4 acts like a conduit for photons. That is, according to data for the mean free path provided in Table I, 662 keV photons should go through at least five interactions in the formation 4 before they can reach the short spaced detector 14. This is a number dictated by the mean free path of the photons at 662 keV. For the long space detector 16, the same number is about 8 interactions. It should be noted that these numbers are lower limits (that is, such values are possible only if all scattering angles are 0 degrees), so the actual numbers would be larger. Compton scattering with nonzero scattering angles would further reduce the energy of the photons, and mean free paths get shorter with lower energy levels. Therefore, with loss of energy, the actual interaction numbers go up to higher values. As a result of those high numbers of interactions taking place in the formation, a very small portion of the photons can reach the detectors. This can be seen in FIGS. 6-7, where FIG. 6 shows the spatial distribution of Compton interactions inside the formation in logarithmic scale. The lower right corner is where the source is located, and the upper right hand corner is where the long space detector is located. This shows, that there is about a nine orders of magnitude change in Compton scattering interactions between source location and long space detector location. The photoelectric absorption interactions follow the same trend but the difference between two locations is around six orders of magnitude. This is one of the reasons why there is a need for a very bright Cs-137 source for gamma density logging. This is also what makes the Cs-137 source (typically around 2 Curie) a potential health hazard for the field engineers.

TABLE I

Mean Free Paths of 662 keV Cs-137 Photons in Various Materials

| Material | Mean Free Path for 662 keV Photons (cm) |
|---|---|
| 0.8 g/cc oil (14% H + 86% C) | 14.3 |
| 1.0 g/cc Fresh Water | 11.7 |
| 1.738 g/cc Pure Magnesium | 7.6 |
| 2.71 g/cc Limestone | 6.2 |
| 2.699 g/cc Pure Aluminum | 5.0 |

TABLE I-continued

Mean Free Paths of 662 keV Cs-137 Photons in Various Materials

| Material | Mean Free Path for 662 keV Photons (cm) |
|---|---|
| 2.65 g/cc Sandstone | 4.9 |
| 2.87 g/cc Dolomite | 4.5 |

TABLE II

Mean Free Paths of 6.130 MeV Oxygen-16 Inelastic Photons in Various Materials

| Material | Mean Free Path for 6.13 MeV Photons (cm) |
|---|---|
| 0.8 g/cc oil (14% H + 86% C) | 46.0 |
| 1.0 g/cc Fresh Water | 36.5 |
| 1.738 g/cc Pure Magnesium | 21.6 |
| 2.71 g/cc Limestone | 13.6 |
| 2.699 g/cc Pure Aluminum | 14.0 |
| 2.65 g/cc Sandstone | 14.3 |
| 2.87 g/cc Dolomite | 13.2 |

TABLE III

Mean Free Paths of 4.439 MeV Carbon Inelastic Photons in Various Materials

| Material | Mean Free Path for 6.13 MeV Photons (cm) |
|---|---|
| 0.8 g/cc oil (14% H + 86% C) | 37.4 |
| 1.0 g/cc Fresh Water | 30.1 |
| 1.738 g/cc Pure Magnesium | 18.6 |
| 2.71 g/cc Limestone | 11.8 |
| 2.699 g/cc Pure Aluminum | 12.2 |
| 2.65 g/cc Sandstone | 12.2 |
| 2.87 g/cc Dolomite | 11.3 |

Figure 7:
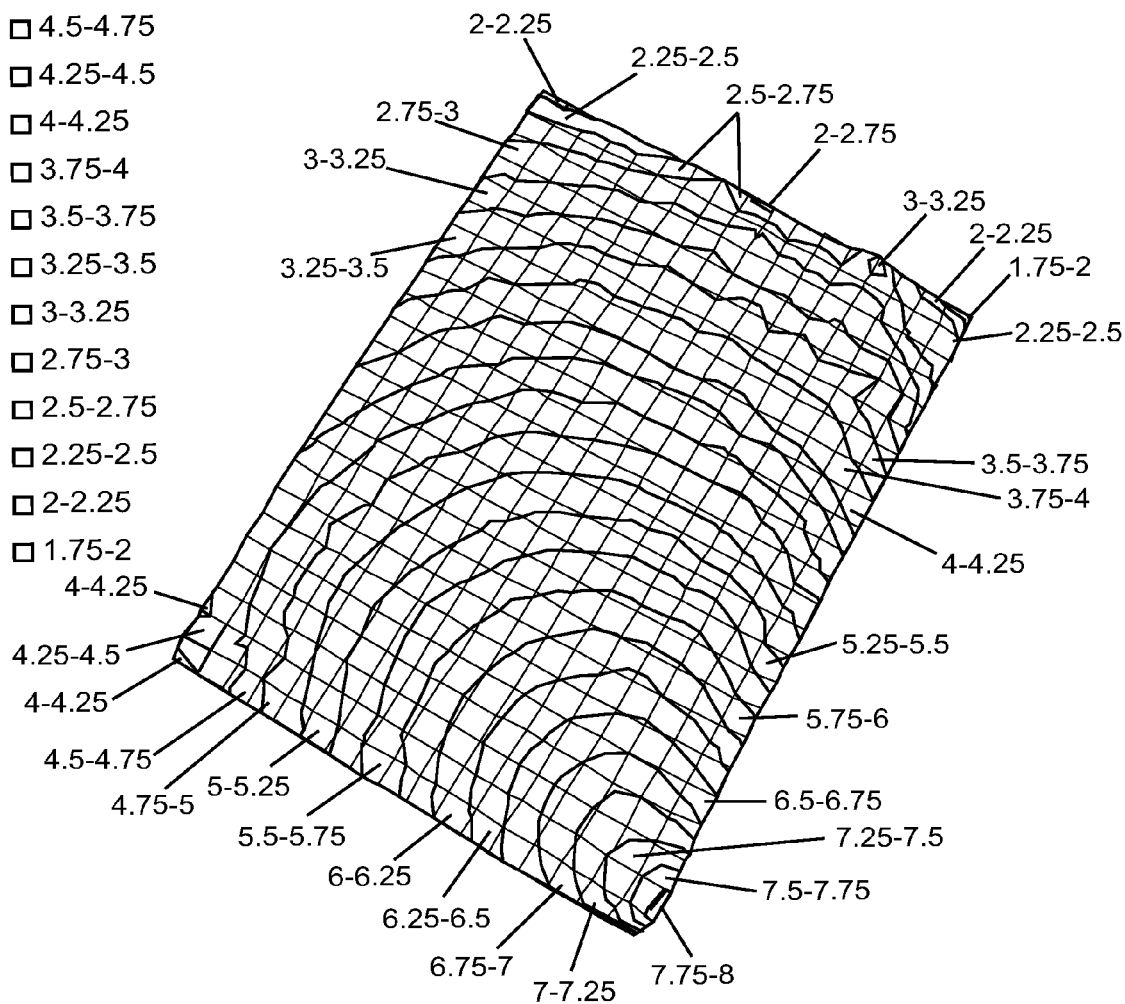
FIG. 7 is a graphic providing a spatial distribution of photoelectric absorption interactions inside the formation (logarithmic scale)

Referring again to the figures, FIG. 4 shows a variation of the photon flux along lines parallel to the density tool 10 for cases without standoff 5. FIG. 5 depicts a variation of the photon flux along lines parallel to the density tool 10 for a case with 1 cm of standoff 5. FIG. 6 depicts a spatial distribution of Compton scattering interactions inside the formation (logarithmic scale), while FIG. 7 depicts a spatial distribution of photoelectric absorption interactions inside the formation (logarithmic scale).

Further aspects of the physics underlying the invention are now discussed. As is widely known, pulsed neutron generators emit neutrons with about 14.2 MeV energy levels. This energy is high enough to induce a large variety of nuclear interactions. What we are basically interested in this application are inelastic and capture interactions. The oxygen and carbon usually emit inelastic photons at the 6.13 and 4.439 MeV levels. What makes those energy levels important is that those are energy levels that are high enough to induce pair production interactions inside the formation 4. As discussed above, conventional density logging is based on Compton scattering. However, in the present invention, high energy photons, such as would cause pair production interactions are used, to provide a good way of reading density values from deeper into the formation 4 then previously achievable with the conventional density logging. Table II gives the mean free paths oxygen inelastic photons inside various formations. Important entries in that table are Limestone, Dolomite and Sandstone values. As it is seen, typical mean free path is around 14-15 cm. This points out that any photon originating in the tool can penetrate into the formation around that distance before it goes through an interaction. The same values for carbon inelastic photons are around 11-12 cm. Both of those provide a good interrogation depth if such a technique is proven to be feasible. As may be seen in Table I, the same distance is around 4-5 cm for Cs-137 photons. When those two sets of mean free paths are compared, it can be seen that using inelastic photons can have significant advantage over Cs-137 photons due to the depth of investigation. Accordingly, the present invention provides gamma photons of sufficient energy such that quality of data is improved. That is, one weak point of currently employed techniques for density logging is the shallow depth of investigation that arises if a sampling volume equates to an invaded zone (a zone invaded with drilling mud).

Further consideration is given to pair production interactions. Every time a photon undergoes a pair production event, 1.02 MeV of the incident energy gives rise to an electron/positron pair with the pair sharing the remaining energy as kinetic energy. The pair production is usually a smaller portion of the interactions taking place inside the formation. This can be seen in FIG. 8, which depicts a ratio of a pair production cross section, $\sigma_{pp}$, to the total cross section, $\sigma_{total}$, as a function of the photon energy. At those higher energy levels, total cross section, $\sigma_{total}$, is predominantly the Compton cross section, $\sigma_{cs}$. Therefore, this ratio can be interpreted as the ratio of pair production to the sum of Compton scattering and pair production cross sections. Although there is some increase with the energy, the change between sandstone, limestone and dolomite is close enough to be handled with an averaging scheme, as needed. Further, annihilation photons originating from inelastic photon pair production interactions may be eliminated from energy spectra as needed by setting a detection threshold higher than 0.511 MeV (which will also reduce pair production effects from the measurements).

Figure 8:
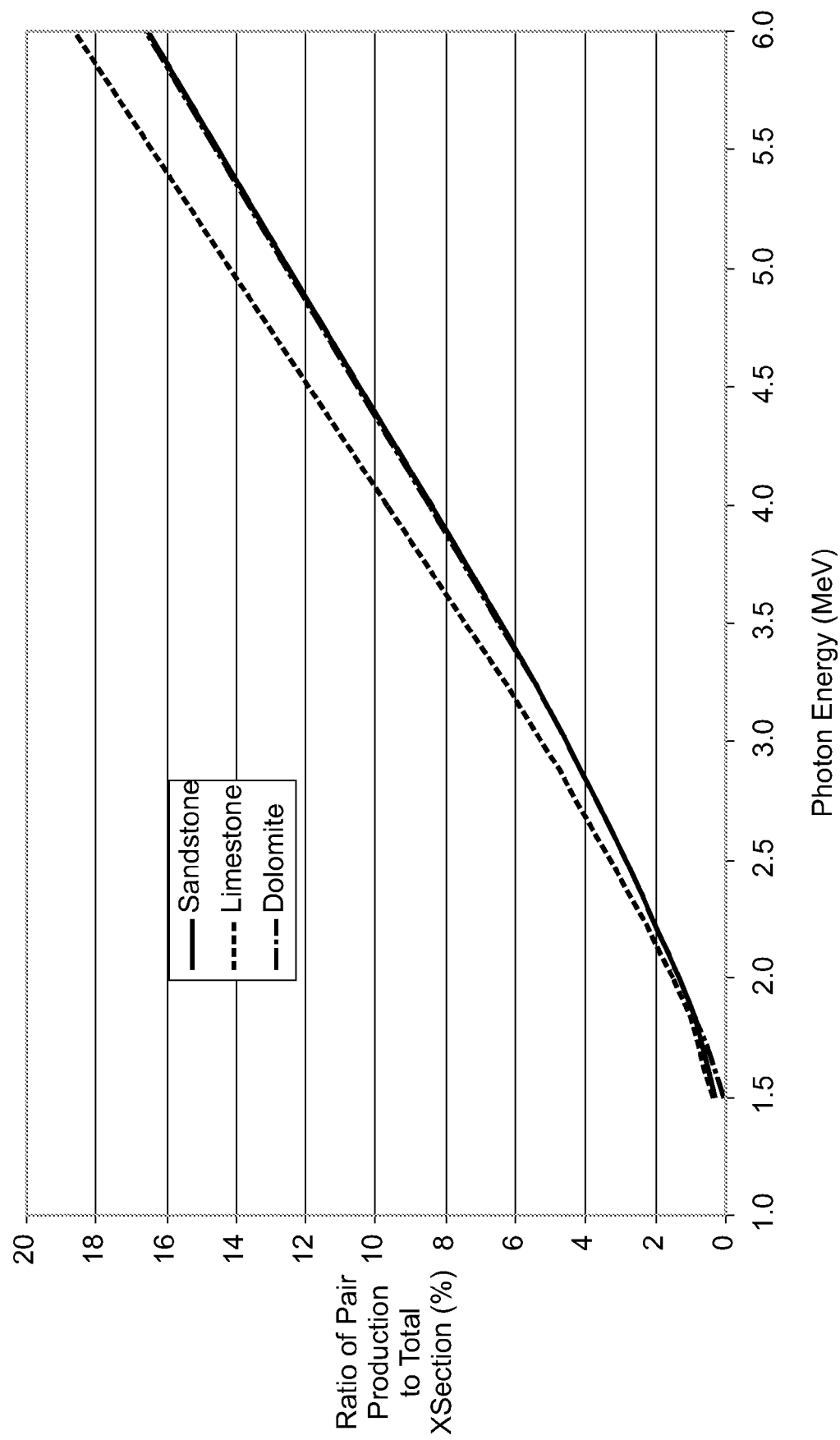
FIG. 8 is a graphic depicting a ratio of pair production cross sections to total cross sections for three formation types.

Since neutrons thermalized inside the tool and in the formation are to be captured and give way to capture photons, this provides another source of gamma radiation for interrogating the formation 4. Normally, there is no way to distinguish inelastic and capture photons. One aspect that is useful in this regard is to obtain the time dependent spectra of the photons. This is something that is routinely done for various types of measurements. More specifically, usually the neutrons slow down to thermal energy levels in about 1-10 microseconds, depending on the medium. After that there is usually a relatively longer time period where the capture takes place and capture photons are emitted. By incorporating temporal response into evaluations of spectra, users are afforded a capability to distinguish the thermal capture photons. As noted above, a principal concern issue with lower energy photons is determined by the mean free path, where a total distance traveled by those photons is significantly shorter than for photons from inelastic interactions. FIG. 8 shows a ratio of pair production cross sections to total cross sections for three formation types.

Figure 9:
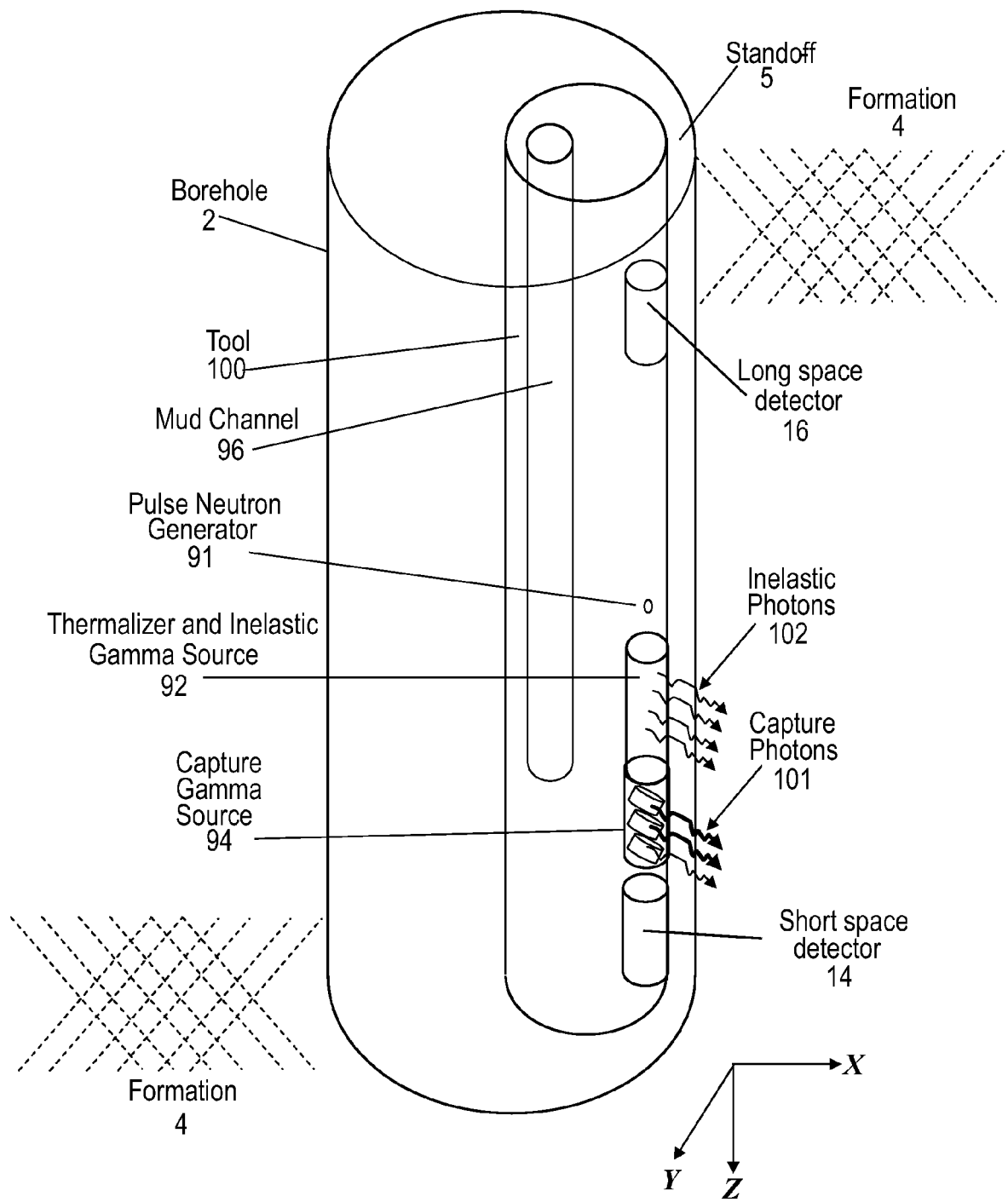
FIG. 9 depicts exemplary aspects of a pulsed neutron generator based gamma density logging tool.

Turning now to a discussion of associated apparatus, consider FIG. 9 with regard to the foregoing discussion of the sourceless gamma density tool. FIG. 9 depicts exemplary aspects of a sourceless gamma density tool 100 (also referred to as an instrument). The sourceless gamma density tool 100 is shown as being disposed into a borehole 2 that traverses a formation 4. As in prior art instruments, the sourceless gamma density tool 100 includes a short space detector 14 and a long space detector 16. Relative positioning of the short space detector 14 and the long space detector 16 is to be adjusted to obtain the best measurement possible. A neutron source 91 is included, and in this embodiment, is a pulsed neutron generator. Arranged proximate to the neutron source 91 is a moderator and inelastic gamma source 92, which may be a hydrogen rich material. Although not as efficient as hydrogen in slowing down the neutrons, some other material may be chosen as well. Generally, located beyond the moderator and inelastic gamma source 92 is a capture gamma source 94 formed of the surrogate material (in this example, of cadmium). The capture gamma source 94 is arranged to receive thermalized neutrons exiting from the moderator and inelastic gamma source 92. The capture gamma source 94 is formed of, among other things, a surrogate material selected for absorbing the thermalized neutrons and producing prompt gamma emissions. Not shown in FIG. 9, but included in the sourceless gamma density tool 100 as appropriate, may be various communications interfaces and channels, electronics units, power supplies and the like. Accordingly, a mud channel 96, shown in FIG. 9, is one example of a supporting component. The mud channel 96 generally provides for communication of data, such as by use of telemetry. The supporting components generally enable operation of the sourceless gamma density tool 100, and may include components disposed topside. One example of a topside supporting component includes computing systems used for performing spectroscopy analyses.

While the sourceless gamma density tool 100 is generally used in logging-while-drilling, the tool 100 may be deployed using wireline systems as well. Accordingly, the embodiment shown in FIG. 9 may represent a portion of either one of a drill string or a wireline logging instrument. In further embodiments, the tool 100 may be deployed by tractor and other such techniques as are known in the art.

In some embodiments, the moderator and inelastic gamma source 92 acts as both a moderator and inelastic photon source while the pulse is on. In general, the moderator and inelastic gamma source 92 includes a low-Z material (i.e., a material having few protons), such as a generally hydrogenous material. A suitable material for use in the moderator and inelastic gamma source 92 is graphite. Although it is not as efficient as hydrogen, the graphite is a moderating material as well and it is used as moderator in some nuclear reactors. This provides users with a strong 4.439 MeV photon source inside the tool 100. In some instances, the actual strength of the source may be higher than the carbon inelastic photons coming from the formation. Carbon presence in the formation is a function of the fluids available in that part of the formation and porosity. Since the carbon inelastic photons have a mean free path of about 11-12 cm, the volume that will contribute to counting statistics may hold carbon that might be much lower than the carbon in the on board carbon (i.e., graphite) block. There will be significant amount of oxygen in the formation and this will provide a significant number of inelastic photons. All things considered, the beam of inelastic photons hitting the detector will contain a significant contribution of inelastic photons generated inside the tool.

Moderation of the neutrons will start immediately while the pulser is on. Since there is an onboard region that is purely moderator, one might expect to see moderation to take place faster than in the formation. Therefore, the early phase of capture photons may be heavily effected by the capture photons originating in the onboard capture photon source. That is, depending on the borehole fluid versus formation material properties, the early phases in the capture time spectrum will have a different slope and that will be used to distinguish a borehole signal versus a formation signal. The same approach may turn out to be valid for this case as well. Since the neutrons will be thermalized faster in the onboard moderator region, the capture target may emit capture photon in the earlier phase of the time spectrum.

Even though different techniques may be employed to strip the onboard photon source gammas from the overall total, the results would not equate to a signal free from the formation photons. However, data from the long-spaced detector 16 may be used to support this task. That is, a signal from the long space detector 16 may be considered representative of formation photons, as this detector 16 is placed far enough from the onboard photon sources so that there is negligible interference from the source. The positioning of the detector 16 is to be determined and adjusted to perform this task efficiently. Among other things, factoring temporal response permits users to refine estimates of formation contributions. Therefore, the signal from the long space detector 16 can be used as a background signal that is being subtracted from the short spaced detector 14. In one embodiment, the distance from the short spaced detector 14 to the neutron source 91 is approximately the same as the distance from the long spaced detector 16 to the neutron source 91. However, because the thermalizer and inelastic gamma source 92 and the capture gamma source 94 are placed to one side of the neutron generator 91 closer to the short spaced detector 14 as shown in FIG. 9, the long spaced detector 16 is spaced farther from the gamma rays produced by the sources 92 and 94 than the short spaced detector 14. Thus, output from the long spaced detector 16 can still be used to subtract gamma rays born in the formation 4 from those gamma rays born in the tool 100.

For convenience, the neutron source 91, the moderator and inelastic gamma source 92, and the gamma capture source 94 may be referred to herein, either in part or collectively as an "irradiator." That is, the irradiator of the sourceless gamma density tool 100 may include any one or more of the neutron source 91, the moderator and inelastic gamma source 92, and the gamma capture source 94.

Figure 10:
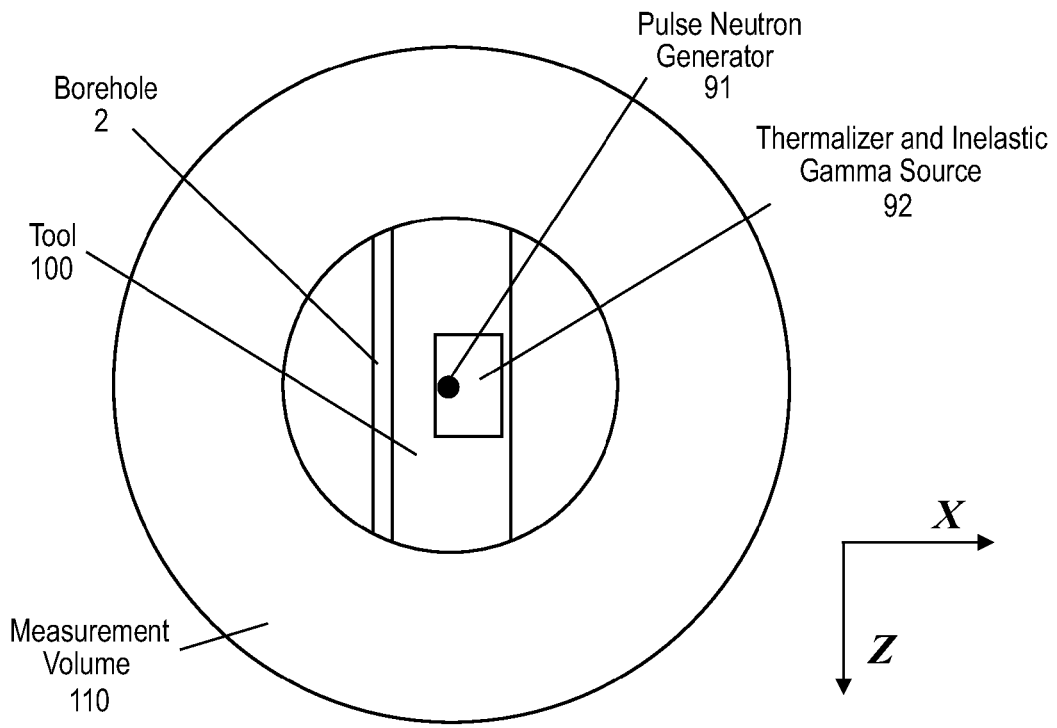
FIG. 10 is an illustration of an axial cross section of a model used in computations.
Figure 11:
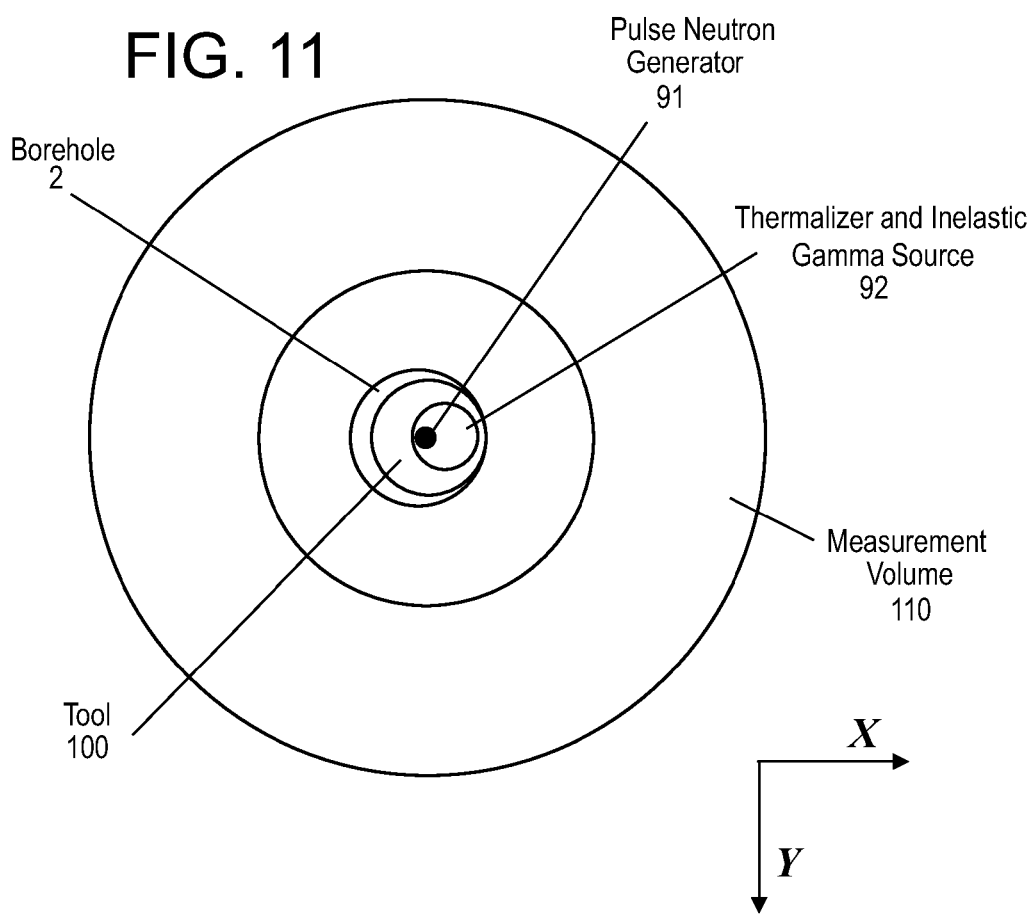
FIG. 11 is an illustration of a radial cross section of the model at z=0.0 cm.
Figure 12:
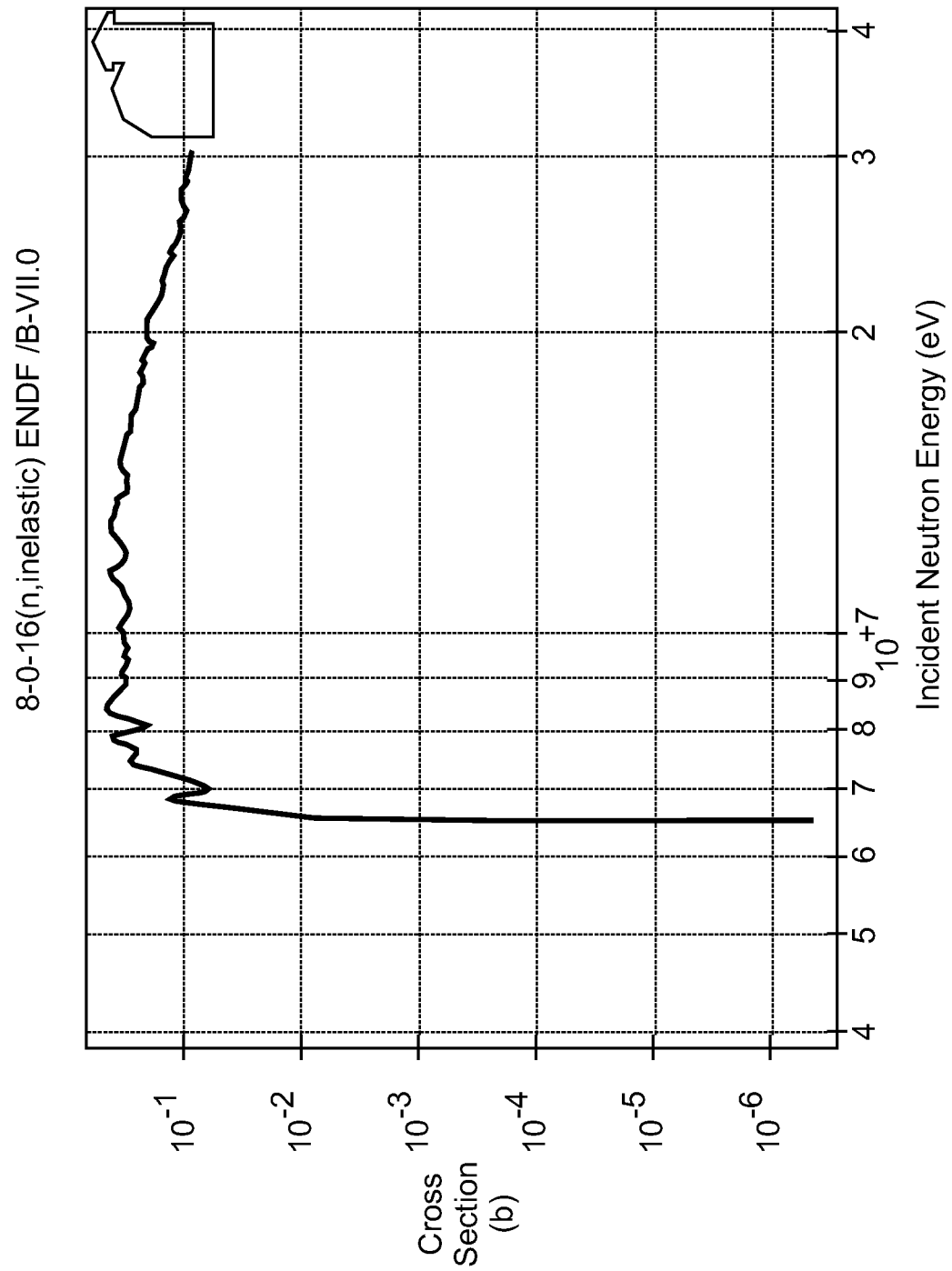
FIG. 12 depicts nuclear inelastic scattering cross sections for Oxygen-16 as a function of incident neutron energy.
Figure 13:
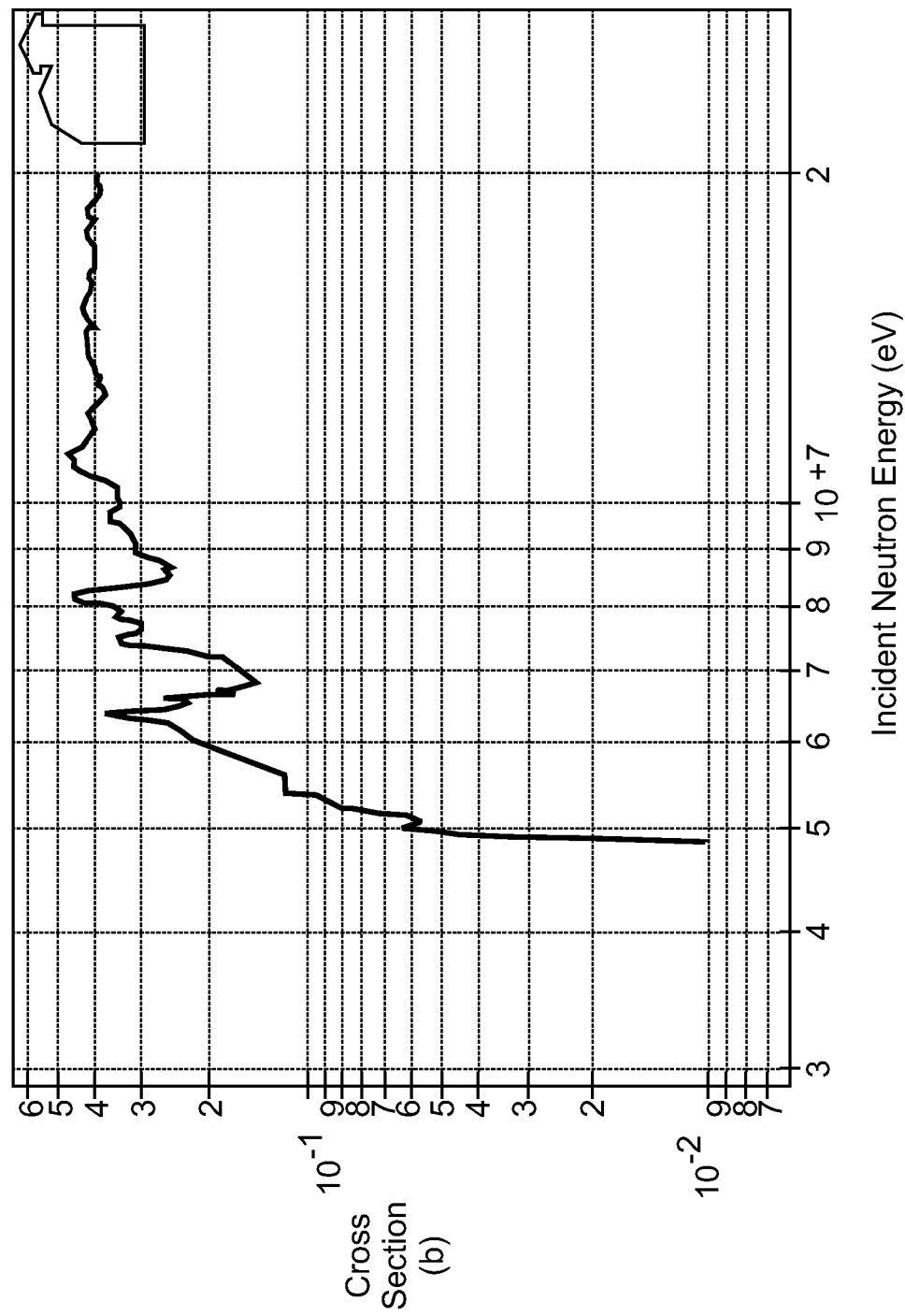
FIG. 13 depicts nuclear inelastic scattering cross sections for elemental carbon as a function of incident neutron energy.

Evaluation of the sourceless gamma density tool 100 has included generation of base models and computation of performance characteristics. Aspects of the base models for computations are given in FIGS. 10-13, where FIG. 10 depicts an axial cross section of a model used in the computations. FIG. 11 depicts a radial cross section of the model at z=0.0 cm. Note that in addition to aspects discussed in FIG. 9, FIGS. 10 and 11 also show a measurement volume 110. Generally, the measurement volume 110 correlates to a volume of the formation 4 into which gamma radiation from the sourceless gamma density tool 100 penetrates and will scatter back to at least one of the detectors 14, 16 (in short, a "survey volume"). FIGS. 12 and 13 show performance related information, where FIG. 12 depicts nuclear inelastic scattering cross sections for oxygen-16, and FIG. 13 depicts nuclear inelastic scattering cross sections for elemental carbon.

In order to anticipate aspects of counting statistics as may be associated with the detectors 14, 16, initial computations were performed. First, in this exemplary computation, it was assumed that the tool 100 had a diameter of 17.15 cm (6¾ inches). The thermalizer and inelastic gamma source 92 (i.e., the moderator) had a diameter of 10 cm and its height is 15.0 cm. Therefore, the thermalizer and inelastic gamma source 92, in the form of a carbon block, was included with an offset to leave room for the mud channel 96. In this example, the borehole 2 is filled with a liquid that was substantially water. The borehole had a radius of 10.16 cm (8 inch diameter). The formation 4 around the tool was a spherical formation, having two layers. The inner layer had a radius of 25 cm. This radius has been chosen because any photos born outside this will have very small chances of making it to the detector. Accordingly, the inner layer effectively correlates to the measurement volume 110. Although the neutron flux will still be quite significant outside the measurement volume 110, the contribution of those neutrons to the measurements is likely to be insignificant.

Figure 14:
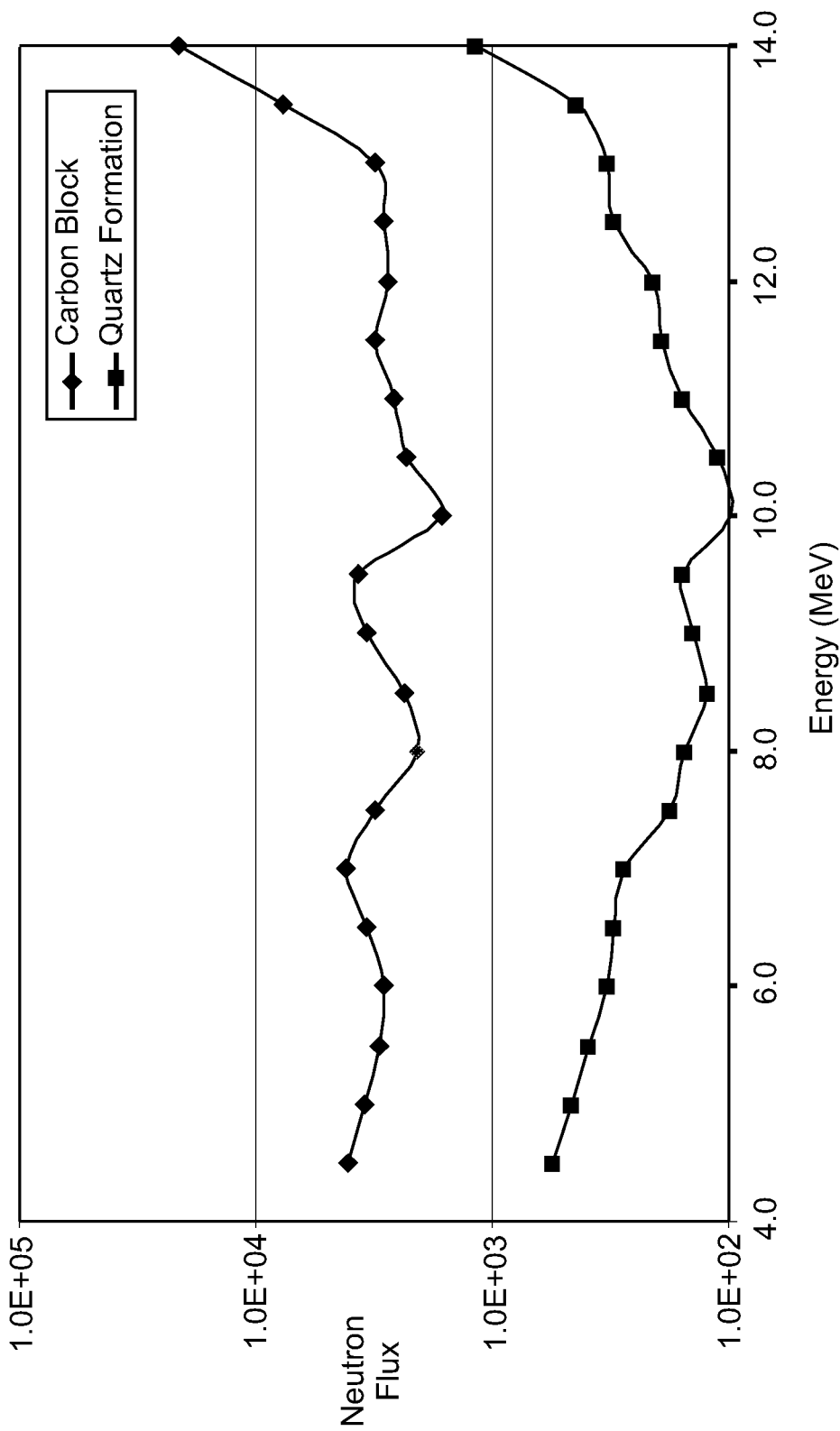
FIG. 14 is a graph of energy dependent neutron fluxes averaged within an onboard graphite block and a 25 cm radius formation sphere.

The simulations were mainly interested in or directed to inelastic reactions in thermalizer and inelastic gamma source 92 (i.e., the carbon block moderator) in the tool 100 and the inelastic reactions in the measurement volume 110. Note that, as shown in FIGS. 12-13, the carbon and oxygen-16 inelastic cross sections are similar to each other in the high energy region, with a major difference between the two spectra is that the threshold value for Oxygen-16 inelastic reactions is around 6.4 MeV. The same threshold for elemental Carbon is 4.8 MeV. Therefore, for a given neutron flux, it is likely to have more carbon inelastic scattering interactions due to the wider energy interval where carbon inelastic scattering can take place. For this case, the neutron flux spectrums for the carbon block and formation are given in FIG. 14. Those are spatially averaged values. FIG. 14 clearly shows that the spatially averaged neutron flux is higher in the carbon block and that is due to the proximity of the neutron source to the carbon block. When the carbon inelastic scattering energy interval and neutron flux values in the carbon block are put together, it is normal to have carbon inelastic reaction rates comparable to the oxygen inelastic interaction rates in the formation although the formation volume is significantly higher. The carbon block considered in this preliminary report is around 1,178 cm$^3$. The same value for the inner formation layer is about 49,000 cm$^3$.

For evaluating lithology and the fluids in the formation, calculations were repeated for sandstone and limestone formations with no porosity, 20% porosity and 40% porosity saturated with oil.

It is desirable to provide users with embodiments where the measurement volume 110 is at least as big, if not bigger, than realized with use of a chemical source. This should be viable for all formations. However, since oil saturated formations will include some carbon, these formations might be of a concern. Accordingly, further evaluations were performed.

Figure 15:
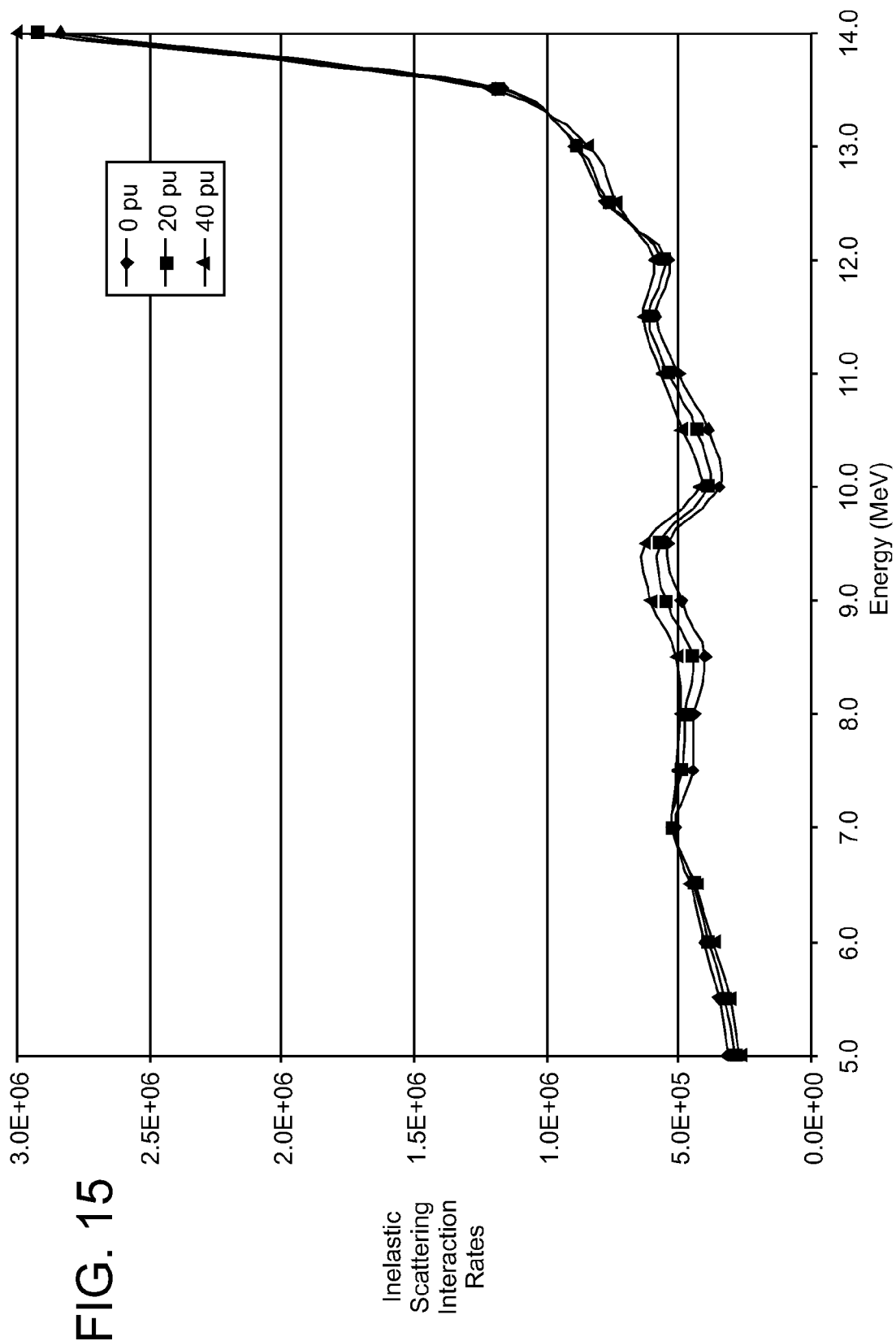
FIG. 15 depicts an energy spectrum of inelastic scattering interactions in limestone having varying oil saturated porosity levels.
Figure 16:
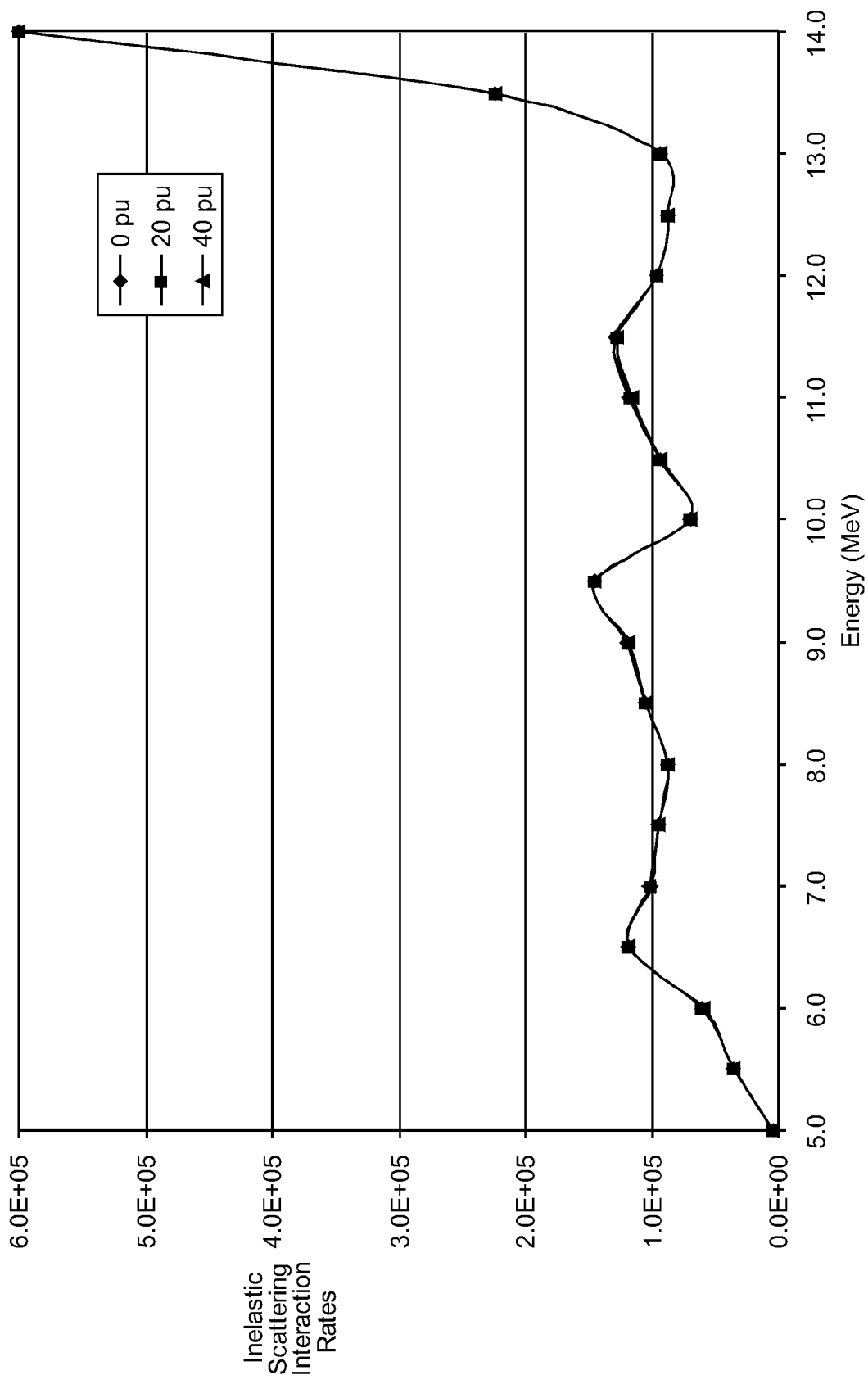
FIG. 16 depicts an energy spectrum of inelastic scattering interactions in an onboard carbon block for varying formation configurations.
Figure 17:
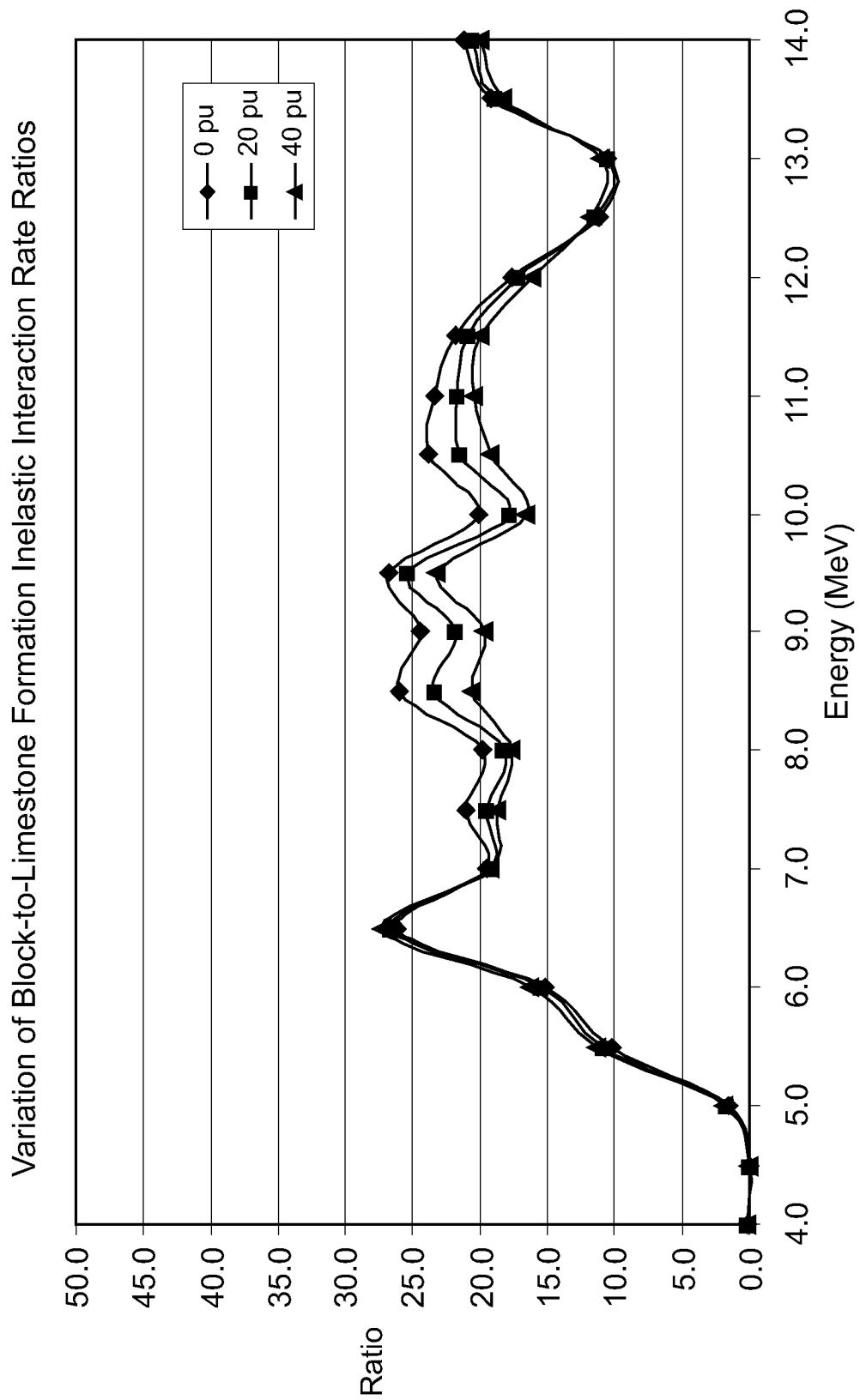
FIG. 17 depicts a ratio of inelastic interaction rates in onboard carbon block and limestone formation as a function of energy.
Figure 18:
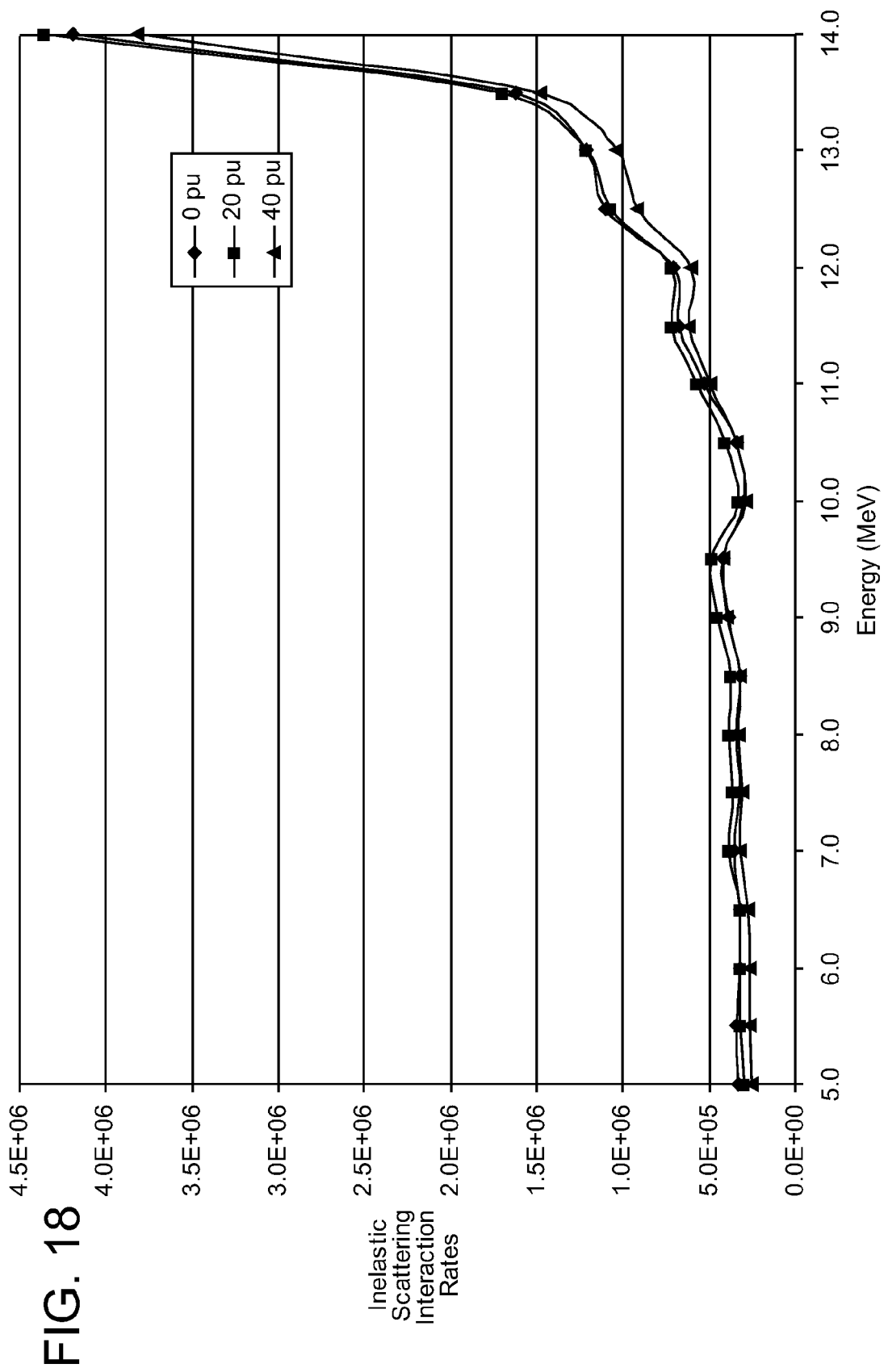
FIG. 18 depicts an energy spectrum of inelastic scattering interactions in sandstone having varying oil saturated porosity levels.

FIG. 15 shows a limestone case with no porosity, 20% porosity and 40% porosity cases. According to the graphic, a substantial difference is not realized. In other words, if an onboard carbon block inelastic source large enough, the tool 100 should work effectively for all types of limestone. FIG. 16 shows the energy spectrums of the carbon inelastic interactions. From these curves, it can be seen that the limestone formation does not have an affect on what is happening in the carbon block. In other words, a stable interrogating beam is provided. FIG. 17 shows the ratio of carbon interaction rates and formation interactions rates. As that figure shows, the ratios are around 20%. That basically shows that a sizeable interrogating beam is realized. If photons from the formation, are removed, there remains an adequate intensity of gamma radiation for density measurements. The variations between three ratio curves are basically due to the variations in the formation originating from the lithology and porosity variations. The carbon block source is basically fixed as shown in FIG. 18.

Figure 19:
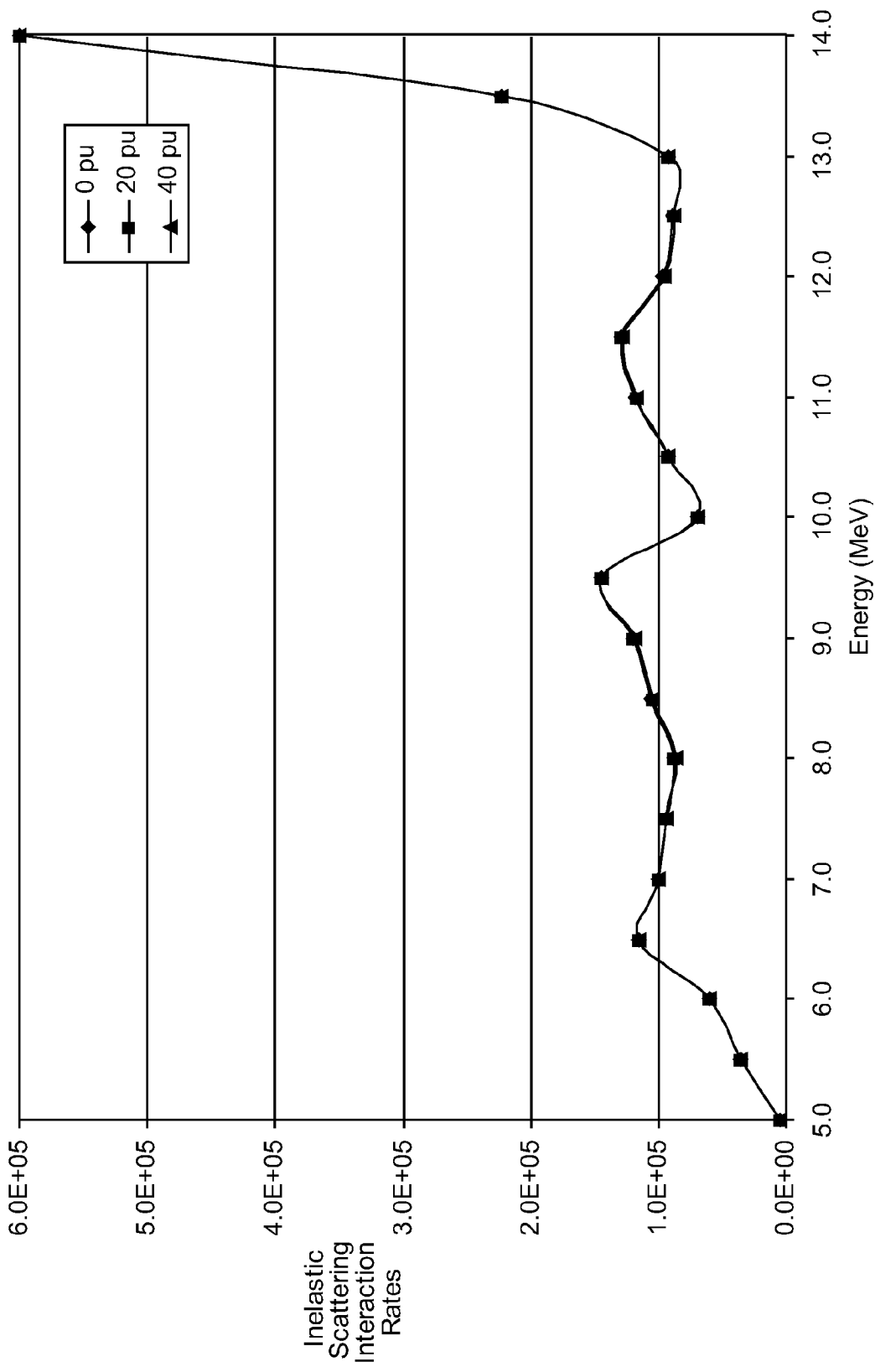
FIG. 19 depicts an energy spectrum for inelastic scattering interactions in the onboard carbon block for varying formation configurations.
Figure 20:
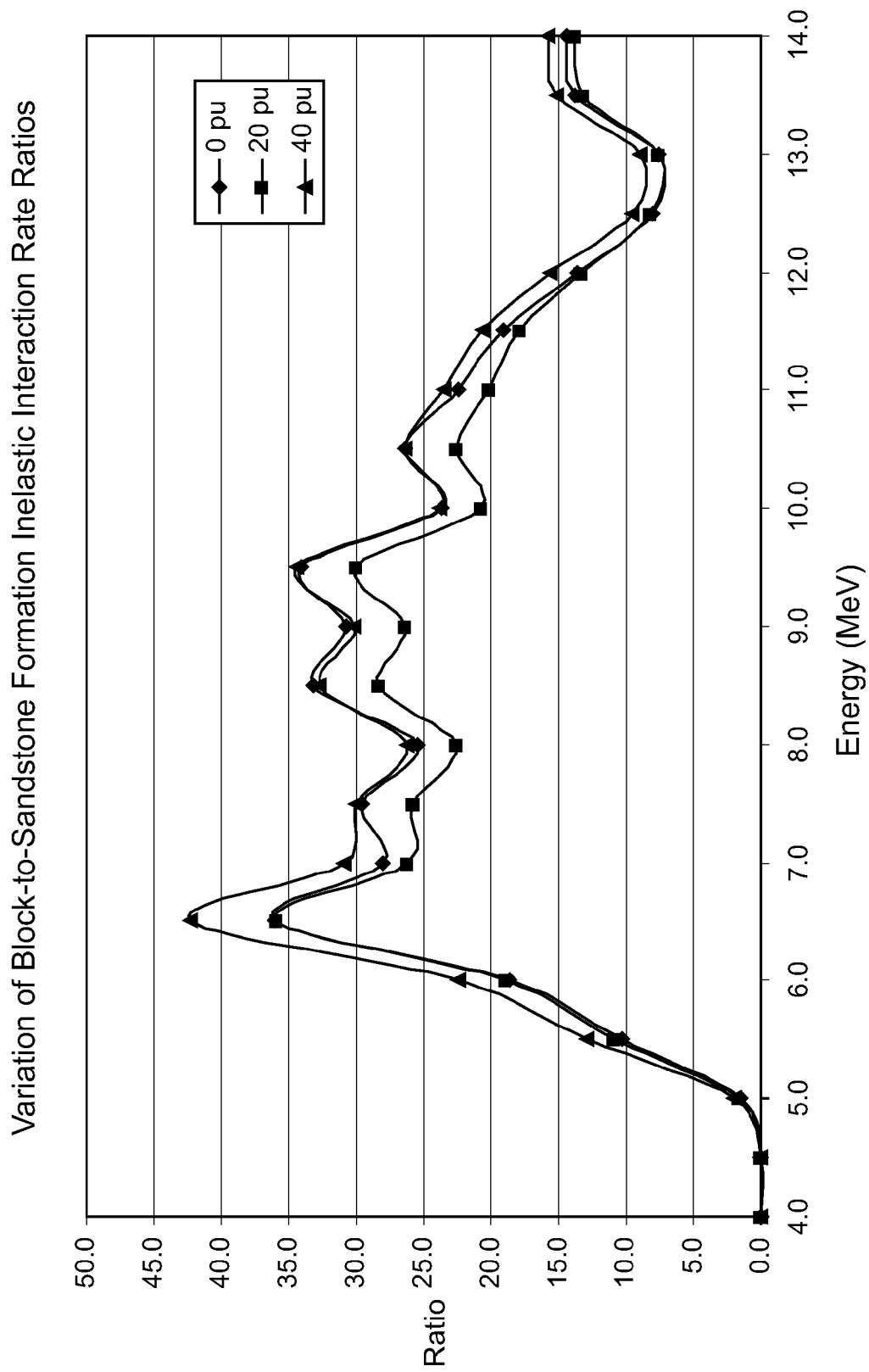
FIG. 20 depicts a ratio of inelastic reaction rates in the onboard carbon block and sandstone formation as a function of energy.

The same has been repeated for sandstone formation as well. In contrast with limestone formation, sandstone formation does not have carbon. Accordingly, the relative inelastic signal strength should be similar for sandstone formation as well. In this case, the inelastic scattering rates in the sandstone formation are given in FIG. 18 for 0, 20 and 40% porosity levels saturated with oil. The interaction rates for the sandstone formation are relatively lower compared to the limestone but the difference is small. In addition, the differences between different porosity levels do not change the reaction rates either. The carbon block interaction rates shown in FIG. 19 are basically the same as the interaction rates in FIG. 16. This ensures that the interrogating beam will be stable not across different porosity levels but across different formations as well.

In summary, the teachings herein provide a unique approach to provide an interrogating beam of gamma radiation. The interrogating beam includes photons from inelastic neutron interactions and capture neutron interactions emitted from an onboard target. The impact of the lithology variations, presence of clay, shale and gas on the neutron interactions in the formation is well known. As with neutron interaction variations, there is to be a change in the photon emission density inside the formation as well. This practically negates use of photons originating in the formation to be used as interrogating beam in density logging. The placement of a gamma generating target inside the tool will overcome this problem and a stable photon source will be obtained. Using an onboard photon generating target does not ensure a neutron generator based density log by itself. There are issues such as count rates, removal of formation born photons from counts, impact of the pair production on the density measurements and those are to be investigated for feasibility of the idea.

In support of the teachings herein, various analysis components may be used, including a digital system and/or an analog system. The system(s) may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

The term "carrier" as used herein means any device, device component, combination of devices, media and/or member that may be used to convey, house, support or otherwise facilitate the use of another device, device component, combination of devices, media and/or member. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An instrument for performing measurements downhole, the instrument comprising:
    an irradiator oriented to irradiate sub-surface materials surrounding the instrument, the irradiator comprising at least one neutron source disposed proximate to a moderator for providing a source of inelastic gamma photons and also disposed proximate to a material for providing a source of capture gamma photons, the irradiator producing an interrogating beam including both the inelastic gamma photons and the capture gamma photons;
    a first detector and a second detector, each detector for detecting gamma rays and oriented in a relationship to the irradiator for receiving gamma photons from at least one of the irradiator and the formation; and
    electronics for performing gamma energy spectroscopy;
    wherein the electronics provide for setting timing gates to discriminate between inelastic gamma photons and capture gamma photons.

2. The instrument as in claim 1, wherein the neutron source is a pulsed neutron generator.

3. The instrument as in claim 1, wherein each of the radiation detectors comprises one of a sodium iodide detector, a BGO detector, a Br-380 detector, a plastic scintillator, and a solid state detector.

4. The instrument as in claim 1, wherein the first detector is a first distance from the irradiator, and the second detector is a second distance from the irradiator.

5. The instrument as in claim 1, wherein the first detector or the second detector is configured to compensate for gamma rays born in the sub-surface materials.

6. The instrument as in claim 1, wherein the first detector is a first distance from the neutron source and the second detector is a second distance from the neutron source.

7. The instrument as in claim 6, wherein the first distance is the same as the second distance with the first detector disposed to one side of the neutron source and the second detector is disposed to an opposite side of the neutron source, the moderator and the material being closest to the first detector, the second detector being used to compensate for gamma rays born in the sub-surface materials.

8. The instrument as in claim 1, further comprising electronics for performing gamma time spectroscopy.

9. The instrument as in claim 1, wherein the electronics provide for setting an energy threshold to discriminate at least one of low energy and high energy gamma photons.

10. The instrument as in claim 1, wherein the source of inelastic gamma photons comprises a neutron moderator.

11. The instrument as in claim 10, wherein the moderator comprises a low-Z material.

12. The instrument as in claim 10, wherein the moderator comprises at least one of graphite, water and plastic.

13. The instrument as in claim 1, wherein the source of capture photons comprises a material having a high cross section for thermal neutrons.

14. The instrument as in claim 13, wherein the source of capture photons comprises at least one of cadmium, hafnium, and gadolinium.

15. The instrument as in claim 1, further comprising boron shielding disposed over at least one of the first detector and the second detector.

16. The instrument as in claim 1, wherein the instrument is configured to be conveyed through a borehole penetrating the sub-surface materials by a carrier.

17. The instrument as in claim 16, wherein the carrier comprises as least one of a wireline, a slickline, a drill string, and coiled tubing.

18. A method for performing measurements downhole, the method comprising:
    using an instrument downhole, the instrument comprising an irradiator oriented to irradiate sub-surface materials surrounding the instrument, the irradiator comprising a pulsed neutron source disposed proximate to a moderator for providing a source of inelastic gamma photons and also disposed proximate to a material for providing a source of capture gamma photons such that the irradiator produces an interrogation beam including both the inelastic gamma photons and the capture gamma photons,
    energizing the pulsed neutron source to provide a neutron flux;
    directing at least one of the neutron flux, the inelastic gamma photons and the capture gamma photons into the sub-surface materials; and
    performing gamma energy spectroscopy using electronics;
    wherein the electronics provide for setting timing gates to discriminate between inelastic gamma photons and capture gamma photons.

* * * * *